(12) United States Patent
Takaku

(10) Patent No.: US 10,589,557 B2
(45) Date of Patent: Mar. 17, 2020

(54) IMAGE FORMING METHOD AND IMAGE FORMING APPARATUS

(71) Applicant: Konica Minolta, Inc., Tokyo (JP)

(72) Inventor: Yusuke Takaku, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 0 days.

(21) Appl. No.: 16/094,107

(22) PCT Filed: Apr. 4, 2017

(86) PCT No.: PCT/JP2017/014040
§ 371 (c)(1),
(2) Date: Oct. 16, 2018

(87) PCT Pub. No.: WO2017/187905
PCT Pub. Date: Nov. 2, 2017

(65) Prior Publication Data
US 2019/0126655 A1 May 2, 2019

(30) Foreign Application Priority Data
Apr. 28, 2016 (JP) .................... 2016-091498

(51) Int. Cl.
*B41M 5/00* (2006.01)
*B41J 11/00* (2006.01)
(Continued)

(52) U.S. Cl.
CPC .............. *B41M 5/0011* (2013.01); *B41J 2/01* (2013.01); *B41J 11/002* (2013.01);
(Continued)

(58) Field of Classification Search
CPC .............. B41M 5/0011; B41M 5/0017; B41M 5/0047; B41M 7/00; B41M 7/0072;
(Continued)

(56) References Cited

U.S. PATENT DOCUMENTS 7,681,966 B2 3/2010 Parker et al.
2013/0194344 A1* 8/2013 Yokohama ........... C09D 11/037
347/20
(Continued)

FOREIGN PATENT DOCUMENTS

EP 2796517 A1 * 10/2014 ............ B41J 2/2107
JP 2010162894 A 7/2010
(Continued)

OTHER PUBLICATIONS

Written Opinion of the International Searching Authority dated Jun. 27, 2018 from International Application No. PCT/JP2017/014040 and English translation.
(Continued)

*Primary Examiner* — Manish S Shah
(74) *Attorney, Agent, or Firm* — Lucas & Mercanti, LLP

(57) ABSTRACT

The present invention relates to an image forming method and an image forming apparatus by an inkjet method using a gel ink, which minimize a gloss difference between an image-formed region and an image-less region, regardless of a type of a paper substrate used. The image forming method of the present invention is a method for forming an image on a paper substrate by using an inkjet ink that undergoes a temperature-induced sol-gel phase transition. The image forming method includes: a step of subjecting a paper substrate to a corona discharge treatment; a step of ejecting liquid droplets of inkjet ink and landing the droplets on a surface of the paper substrate subjected to the corona discharge treatment; and a step of irradiating the droplets of the inkjet ink landed on the paper substrate with an actinic light ray to cure the inkjet ink.

7 Claims, 3 Drawing Sheets

(51) Int. Cl.
*B41J 2/01* (2006.01)
*B41M 7/00* (2006.01)
*C09D 11/34* (2014.01)
*C09D 11/38* (2014.01)

(52) U.S. Cl.
CPC ........ *B41J 11/0015* (2013.01); *B41M 5/0023* (2013.01); *B41M 7/0081* (2013.01); *C09D 11/34* (2013.01); *C09D 11/38* (2013.01)

(58) Field of Classification Search
CPC .... B41M 5/52; B41M 5/5218; B41J 2/04588; B41J 2/04595; B41J 2/04586; B41J 2/14274; B41J 11/0015; B41J 11/002; B41J 2/1433; B41J 2/161; B41J 2/1623; B41J 2202/00; B41J 2202/03; B41J 2/14201; B41J 2/045; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52
See application file for complete search history.

(56) References Cited

U.S. PATENT DOCUMENTS

| 2013/0321525 | A1* | 12/2013 | Fujii ............... B41M 5/0011 347/21 |
| 2014/0002539 | A1* | 1/2014 | Goto ............... C09D 11/322 347/20 |
| 2014/0204156 | A1* | 7/2014 | Gotou ............. B41J 2/01 347/100 |
| 2016/0052302 | A1 | 2/2016 | Willems et al. |

FOREIGN PATENT DOCUMENTS

| JP | 2012240240 | A | 12/2012 |
| JP | 2013215923 | A | 10/2013 |
| JP | 2014140993 | A | 8/2014 |
| JP | 2016525950 | A | 9/2016 |
| WO | 2014173763 | A1 | 10/2014 |
| WO | 2015001790 | A1 | 1/2015 |

OTHER PUBLICATIONS

Extended European Search Report dated Apr. 12, 2019 for corresponding European Patent Application EP 17789193.
International Search Report dated Jun. 27, 2017 for PCT/JP2017/014040 and English translation.

* cited by examiner

IMAGE FORMING METHOD AND IMAGE FORMING APPARATUS

CROSS REFERENCE TO RELATED APPLICATION

This Application is a 371 of PCT/JP2017/014040 filed on Apr. 4, 2017 which, in turn, claimed the priority of Japanese Patent Application No. 2016-091498 filed on Apr. 28, 2016, both applications are incorporated herein by reference.

TECHNICAL FIELD

The present invention relates to an image forming method and an image forming apparatus.

BACKGROUND ART

Inkjet recording methods, which enable simple and inexpensive image formation, have been used in various printing fields. As one type of inkjet inks, there have been known inks that contain a photocurable compound to be cured by irradiation with actinic radiation (hereinafter, simply referred to as "actinic radiation curable inks").

Recently, there have been developed actinic radiation curable inks that contain a gelling agent and undergo temperature-induced sol-gel phase transition (hereinafter, simply referred to as "gel inks"). The gel ink is warmed to be a sol and can be ejected from a nozzle of an inkjet head. After ejection, the ink is cooled to be gelled when landed on a recording medium, and thus is characterized by having a high pinning property after landing. Irradiating the gel ink pinned on the surface of the recording medium with actinic radiation causes the gel ink to be cured on the surface of the recording medium to thereby form an image.

There have been researched various techniques to form a desired image using gel inks. For example, PTL 1 describes a method in which the quality of an image to be formed is adjusted depending on a substrate by adjusting the viscosity of a gel ink landed on the substrate by preheating the substrate in order to control spreading of droplets of the ink. PTL 2 describes a method in which a gel ink landed on a less flat substrate such as a corrugated board is irradiated with ultraviolet radiation while planarized by pressure from a transparent nip to thereby level the height of a cured film to be formed on the substrate. In the method described in PTL 2, which is a method used for printing on a less flat surface such as an outer layer of a corrugated board, it is conceived that planarizing the surface of a cured film increases the gloss.

PTL 3 mentions that a polyethylene terephthalate (PET) substrate is subjected to corona discharge treatment before formation of an image by use of gel inks. The corona discharge treatment on the substrate that is performed in PTL 3 is conceived to be performed for improving the leveling property of the ink landed.

PTL 4 discloses an inkjet recording method by which an image having a uniform gloss without sense of incongruity can be obtained on a non-absorptive or slightly absorptive substrate by use of gelling agent-containing actinic radiation curable inkjet inks, with which the glossiness of an image to be formed changes depending on a difference in temperatures of recording media.

CITATION LIST

Patent Literatures

PTL 1 U.S. Pat. No. 7,681,966
PTL 2 Japanese Patent Application Laid-Open No. 2010-162894
PTL 3 WO 2015/001790
PTL 4 Japanese Patent Application Laid-Open No. 2012-240240

SUMMARY OF INVENTION

Technical Problem

According to the method described in PTL 1 or PTL 4, making droplets of the ink likely to spread reduces unevenness of the cured film surface, or making droplets of the ink unlikely to spread increases the unevenness of the cured film surface. It is thus conceived that adjusting the unevenness of the cured film surface enables the glossiness of an image to be adjusted. Also according to the method described in PTL 2, it is conceived that adjusting the unevenness of the cured film surface enables the glossiness of an image to be adjusted. According to the investigations of the present inventor, however, an attempt to control glossiness by heating as in PTL 1 may often vary the pinning properties of a gel ink. It is thus difficult to achieve glossiness and pinning properties simultaneously. With adjustment of the gloss, the pinning properties degrade, leading to frequent occurrence of color bleeding due to coalescence of droplets landed on a recording medium or the like. Alternatively, as in PTL 2, when adjustment of the gloss is attempted by means of physical measures such as a roller, it is difficult to prevent an ink from adhering to the roller. The ink adhering the roller further adheres to other portion of the recording medium to thereby frequently cause color bleeding.

Non-absorptive substrates such as PET used in PTL 3 and films used in PTL 4 and slightly absorptive substrates such as coated paper have relatively high gloss. Accordingly, in forming an image on such a substrate, from the viewpoint of reducing a sense of incongruity resulting from the gloss difference between the substrate and the image, an increase in the gloss of the image portion is desired.

Images formed with a gel ink containing a gelling agent are likely to have a lower gloss because unevenness is likely to occur on the surface of a cured film that is formed by irradiating droplets of the ink landed on the substrate with actinic radiation, as described in PTL 4. Thus, when an image is formed using a gel ink on a paper substrate having relatively a low gloss, it is conceived that the sense of incongruity of the image can be reduced because the gloss difference between a printed portion (area on which the ink is landed) and a non-printed portion (area on which no ink is landed) is smaller than that of a common UV ink which contains no gelling agent. However, the gloss of paper substrates depends variously on the type of paper substrates. Then, there is a desire for a method for forming an image having a smaller gloss difference using a gel ink, irrespective of the glossiness of paper substrates.

The present invention has been made in view of the above problems, and an object thereof is to provide an image forming method capable of reducing a gloss difference between a printed portion and a non-printed portion depending on the type of paper substrates in forming an image using a gel ink on a paper substrate by an inkjet method, and an image forming apparatus with which such an image forming method can be performed.

Solution to Problem

The above object of the present invention can be achieved by the following means.

[1] An image forming method for forming an image on a recording medium by use of an inkjet ink which contains a photocurable compound and a gelling agent having no polymerizable group and which undergoes temperature-induced sol-gel phase transition, wherein the gelling agent has an alkyl group with a linear portion containing 12 or more and 26 or less carbon atoms, and the recording medium is a paper substrate having a 60° gloss value of 5 or more and 50 or less before a corona discharge treatment, the method comprising:

performing the corona discharge treatment on the paper substrate;

ejecting droplets of the inkjet ink from a nozzle of an inkjet head and landing the droplets on a surface of the paper substrate subjected to the corona discharge treatment; and irradiating the droplets of the inkjet ink landed on the paper substrate surface with actinic radiation to cure the inkjet ink.

[2] The image forming method according to [1], comprising, before performing the corona discharge treatment of the paper substrate, setting an amount of a corona discharge for surface modification of the paper substrate by referring to a table which correlates a type of the paper substrate, a type of the inkjet ink, and the amount of the corona discharge necessary for the surface modification, wherein the corona discharge treatment of the paper substrate is performed with the set amount of the corona discharge.

[3] The image forming method according to [1] or [2], wherein the amount of the corona discharge for performing the corona discharge treatment is 5 W·min/m² or more and less than 200 W·min/m².

[4] The image forming method according to [3], wherein the amount of the corona discharge for performing the corona discharge treatment is 10 W·min/m² or more and less than 150 W·min/m².

[5] The image forming method according to any one of [1] to [4], wherein the gelling agent comprises at least one member selected from the group consisting of compounds represented by the general formulas (G1) and (G2):

R1-CO-R2        General formula (G1):

R3-COO-R4       General formula (G2):

wherein R1 to R4 each independently represent an alkyl group containing a linear portion having 12 or more and 26 or less carbon atoms and optionally containing a branch.

[6] The image forming method according to any one of [1] to [5], wherein the photocurable compound contains a (meth)acrylate compound having a molecular weight of 280 or more and 1,500 or less and a C log P value of 4.0 or more and 7.0 or less.

[7] An image forming apparatus comprising:

a corona discharge treatment section that modifies a surface of a recording medium;

an inkjet head having a nozzle face, on which an ejection port of a nozzle is provided, the nozzle being capable of ejecting droplets of an inkjet ink which contains a photocurable compound and a gelling agent having no polymerizable group and which undergoes temperature-induced sol-gel phase transition;

a conveying section that conveys the recording medium at a position which is in vertical direction and directly below the ejection port of the nozzle of the inkjet head, so as to move the recording medium opposite to the inkjet head;

an irradiation section that irradiates an upper face of the conveying section with actinic radiation from a light source; and a control section that controls the corona discharge treatment section, the inkjet head, the conveying section and the irradiation section;

wherein the recording medium is a paper substrate, and the corona discharge treatment section performs a surface treatment of a paper substrate having a 60° gloss value of 5 or more and 50 or less.

Advantageous Effects of Invention

According to the present invention, there is provided an image forming method for forming an image that has a smaller gloss difference between a printed portion and a non-printed portion and sufficient curability, irrespective of recording media, in forming an image using a gel ink by an inkjet method.

BRIEF DESCRIPTION OF DRAWINGS

FIG. 1A is a graph of an example suitable for the present invention, and FIGS. 1B and 1C are graphs of examples not suitable for the present invention. In the figures, A represents the 60° gloss value of the non-printed portion before a corona discharge treatment, B represents the 60° gloss value of the printed portion before a corona discharge treatment, A represents the absolute value of B−A, A' represents the 60° gloss value of the non-printed portion after a corona discharge treatment, B' represents the 60° gloss value of the printed portion after a corona discharge treatment, and A' represents the absolute value of B'−A'.

DESCRIPTION OF EMBODIMENTS

Figure 1A:
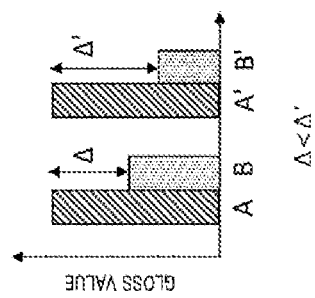
FIGS. 1A, 1B, and 1C are graphs schematically showing the relation of 60° gloss values of a printed portion and a non-printed portion before and after a corona discharge treatment.

Irradiating a gel ink that contains a gelling agent having no polymerizable group with actinic radiation (ultraviolet radiation) or the like cures the gel ink, but the gelling agent having no polymerizable group is not incorporated into a polymer chain formed by polymerization of the photocurable compound, and a portion of the gelling agent migrates to the vicinity of the cured film surface. It is conceived that this is because the gelling agent, which is generally a hydrophobic compound, is likely to migrate from the inside of the cured film (which is more hydrophilic than the gelling agent) to the vicinity of the cured film surface (which is more hydrophobic). As the amount of the gelling agent that migrates to the vicinity of the surface increases, unevenness that occurs on the surface of the cured film increases. Thus, the gloss of the image formed is conceived to decrease.

The present inventor has intensively studied on measures for adjusting the amount of the gelling agent that migrates to the vicinity of the surface to find that the proportion of the gelling agent that migrates to the vicinity of the cured film surface can be adjusted by varying the surface properties of the paper substrate as a recording medium. Specifically, a paper substrate having a 60° gloss value of 5 or more and 50 or less before a corona discharge treatment is subjected to the corona discharge treatment to thereby increase polar groups on the paper substrate surface in order to increase the degree of hydrophilicity. When an image is formed on the surface with a gel ink that contains a gelling agent having no polymerizable group and having an alkyl group that contains a linear portion having 12 or more and 26 or less carbon atoms and a photocurable compound, the gelling agent in the ink droplets landed on the paper substrate is repelled from the substrate surface, and the proportion of the gelling agent that orients to the vicinity of the surface of the ink cured film is conceived to increase. As a result, the unevenness of the cured film surface increases to thereby reduce the gloss of the image portion.

The corona discharge treatment is a treatment to cause electrons generated by use of a high-frequency high voltage to impinge on the substrate surface.

Additionally, the present inventor has focused on the change in the gloss value of the image to be formed with the gel ink caused by changing the amount of the corona discharge for surface treatment. Generally, an increase in an amount of a corona discharge used for surface treatment of a paper substrate tends to decrease the gloss value of an image. In contrast, an excessive corona discharge tends to decrease the curability of the ink. It is conceived that the decrease in the curability of the ink occurs because, when the degree of hydrophilicity of the substrate surface is raised by the corona discharge treatment, a portion of the ink permeates into the substrate before the ink is cured, and the curing becomes insufficient. In the case of a color ink, the permeation of the color ink into the substrate may make difficult the representation of vivid color tones. Accordingly, in order to reduce the gloss value of the image and also maintain sufficient ink curability and vivid color tones, it is necessary to treat the surface of paper substrates with an appropriate amount of corona discharge.

The amount of the corona discharge necessary for achieving a small gloss difference between obtaining the image and the substrate and a high curability depends both on the type of paper substrates and the type of gel inks. A preferred combination of a paper substrate and an ink which enables a reduction of the gloss difference between a non-printed portion and a printed portion to an unperceivable level by the corona discharge treatment of a paper substrate surface is a combination that satisfies a relationship: (B−A)>(B'−A'). In this relationship, (B−A) is an absolute value of the difference between the 60° gloss value of printed portion B and the 60° gloss value of non-printed portion A, when an image is formed on a paper substrate without any corona discharging, and (B'−A') is an absolute value of the difference between the 60° gloss value of printed portion B' and the 60° gloss value of non-printed portion A', when an image is formed on a paper substrate with corona discharging. When the gloss difference between the paper substrate and the ink is large, that is, (B−A) is 10 or more, more preferably (B−A) is 20 or more and 50 or less, still more preferably (B−A) is 20 or more and 40 or less, the effect of the present invention is achieved more remarkably. When the gloss difference is within this range, a sufficient effect can be achieved by a corona discharge treatment with a corona discharge amount in the range of 5 W·min/m² or more and less than 200 W·min/m².

Figure 1B:
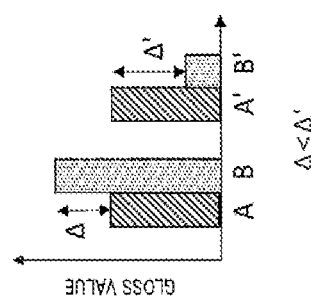
Figure 1C:
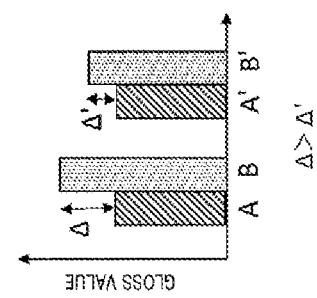

The relationship of the 60° gloss values of the printed portion and non-printed portion before and after the corona discharge treatment are schematically shown in FIGS. 1A, 1B, and 1C. FIG. 1A shows a preferred example of the present invention in which a paper substrate with a printed portion having a 60° gloss value higher than that of a non-printed portion is combined with a gel ink, and an appropriate corona discharge treatment resulted in a moderate reduction of the 60° gloss value of the printed portion, thus providing the relationship (B−A)>(B'−A') (i.e., Δ>Δ'). In contrast, FIG. 1B shows an example not suitable for the present invention, in which an excessive corona discharge treatment markedly reduced the 60° gloss value of the printed portion to a value smaller than that before the corona discharge treatment, thus providing the relationship (B−A)<(B'−A') (i.e., Δ<Δ'). FIG. 1C shows a case in which the 60° gloss value of the non-printed portion A of the paper substrate before the corona discharge treatment is 50 or more. Use of such a paper substrate is an example not suitable for the present invention because the 60° gloss value of the printed portion may often be lower than that of the non-printed portion and the difference between the 60° gloss values (Δ') tends to become enlarged due to a further reduction in the 60° gloss value of the printed portion by the corona discharge treatment.

In the present invention, the amount of the corona discharge necessary for modifying the surface of the paper substrate is determined in view of the combination of the paper substrate and the gel ink described above and the effect of corona discharging and the like and, then, the corona discharge treatment is performed on the paper substrate. The corona discharge treatment enables formation of an image having a small gloss difference between the printed portion and the non-printed portion and sufficient curability. Additionally, in the present invention, in view of the above-described combination of the paper substrate and the gel ink, the effect of corona discharging and the like, it is preferred to provide a table, in advance, in which the type of paper substrates, type of inks, and the amounts of the corona discharges necessary for surface modification of the paper substrate are correlated with one another and to set the amount of the corona discharge with reference to the table like this. In this manner, in formation of an image by use of combinations of various types of recording media and various types of inks in an image forming apparatus, it is possible to form an image having a small gloss difference between the printed portion and the non-printed portion and sufficient curability.

Usually only one ink set is included in an image forming apparatus, and only several types of paper substrates are used. Thus the number of combinations of a paper substrate and an ink is within a limited range. Accordingly, preparation of the table described above does not require a study of wide variety of combinations.

Hereinafter, the present invention will be described with reference to exemplary embodiments, but the present invention is not construed to be limited by the following embodiments.

1. Image Forming Method

One embodiment of the present invention is an image forming method that includes performing the corona discharge treatment on a paper substrate, landing droplets of an ink on the paper substrate, and curing the ink. In a preferable image forming method, before performing the corona discharge treatment on a paper substrate, setting the amount of the corona discharge for surface modification of the paper substrate is performed and the corona discharge treatment on the paper substrate is performed with the set amount of the corona discharge.

1-1. Performing the Corona Discharge Treatment on Paper Substrate

In the present step, a corona discharge treatment is performed on a paper substrate.

Recording media covered by the present invention are paper substrates having a 60° gloss value of 5 or more and 50 or less. When a paper substrate originally has a relatively high gloss value or an ink cured film has a low gloss value, the gloss difference between the non-printed portion and the printed portion is small, and thus it is not necessary to reduce the gloss value of the printed portion by surface modification treatment on the paper substrate. It is rather considered that the gloss value of the printed portion is excessively reduced by the corona discharge treatment to thereby increase the gloss difference with the non-printed portion (see FIG. 1C). Accordingly, paper substrates covered by the image forming method of the present invention are paper substrates having a relatively low 60° gloss value, and preferred paper substrates have a 60° gloss value of 10 or more and 40 or less, more preferably 10 or more and 30 or less.

Examples of the paper substrates having a 60° gloss value of 5 or more and 50 or less include coated paper, slightly coated paper, and non-coated paper including plain paper (copy paper and plain paper for printing), art paper, coated paper, light-weight coated paper, cardboards, thin corrugated boards, and corrugated boards.

An ink to be used in the present invention is an inkjet ink that contains a photocurable compound and a gelling agent and undergoes temperature-induced sol-gel phase transition, in which ink, the gelling agent has no polymerizable group and has an alkyl group having a linear portion having 12 or more and 26 or less carbon atoms (hereinafter, also simply referred to as "the ink of the present invention"). When such an ink is used, the gloss value of the ink can be reduced by the corona discharge treatment on a paper substrate to the extent to which no incongruity from the paper substrate is perceived.

Apparatuses for performing the corona discharge treatment in the present invention are not particularly limited, and any known apparatus can be used. Specifically, it is possible to use a corona treatment apparatus that includes a treatment station including at least electrodes and a dielectric. As the electrodes, metal electrodes, ceramic electrodes and the like can be used. As the dielectric, rolls made of silicone, ceramic, stainless and the like can be used.

As the power source necessary for discharging, commercially available high-frequency power sources can be used as appropriate, depending on the degree of a treatment required. The maximum output power required from such a power source is not particularly limited. When a productivity of 10 m/min or more is necessary for surface treatment, a power source of about 2 kW to 5 kW is preferably used.

The amount of the corona discharge in the corona treatment apparatus as described above is calculated by the following expression:

$$\text{Discharge} = \frac{P}{L \times V} \quad \text{[Expression 1]}$$

wherein $L$ is the length of a discharge electrode (m), $V$ is a film speed (m/min), and $P$ is discharge power (W).

The corona discharge treatment on a paper substrate is performed with a corona discharge that increases polar groups on the paper substrate surface to enhance the degree of hydrophilicity but does not significantly reduce the curability of the printed portion in forming an image. The corona discharge treatment may be performed with a predetermined amount of a corona discharge uniformly irrespective of the type of paper substrates and type of inks. Alternatively, the amount of the corona discharge may be changed for each combination of a paper substrate and an ink. An amount of the corona discharge to be used for reducing the gloss value of the ink in the present invention is preferably 5 W·min/m$^2$ or more and less than 200 W·min/m$^2$. In order to maintain high curability of the ink, the amount of the corona discharge is preferably 10 W·min/m$^2$ or more and less than 150 W·min/m$^2$. With a discharge within this range, so long as an image is formed with the ink of the present invention on a paper substrate having a 60° gloss value of 5 or more and 50 or less, it may be possible to form an image having a small gloss difference between the printed portion and the non-printed portion and having sufficient curability.

An example of a measure to evaluate the degree of surface modification by the corona discharge treatment on a paper substrate is a water contact angle 500 msec after pure water is dropped on the paper substrate. The water contact angle is an index of the wettability of a substrate surface, which is conceived to be decreased by the corona discharge treatment. With a smaller water contact angle, the surface of the substrate is conceived to be more hydrophilic. When a paper substrate to be used in the present invention is treated with the amount of the corona discharge described above, the water contact angle becomes smaller than before the treatment. It is conceived that the angle will be usually about 50° or more and 85° or less, preferably about 60° or more and 75° or less.

The water contact angle of the paper substrate surface can be determined by measurement with a contact angle meter. For example, the contact angle on each substrate 500 msec after landing using pure water can be evaluated by use of a fully automatic contact angle meter DM-701 manufactured by Kyowa Interface Science Co., Ltd., by reference to JIS-R-3257 "Testing method of wettability of glass substrate". Since the contact angle of the paper substrate susceptible to the influence of the measurement environment, it is preferred to adjust the temperature to 20° C. and the humidity to 50% before the measurement.

When the amount of the corona discharge is changed for each combination of a paper substrate and an ink, setting the next amount of the corona discharge is preferably performed before the present step.

(Setting Amount of Power for Corona Discharge for Modifying Surface of Paper Substrate)

In the present step, the amount of the corona discharge for modifying the surface of the paper substrate is set depending on the type of paper substrates and type of inkjets ink to be used.

The amount of the corona discharge can be set with reference to a table in which the type of paper substrates, type of inks to be used, and the amount of the corona discharges necessary for surface modification of the paper substrates are associated with one another. In the table described above, for combinations of a paper substrate and an ink having a gloss difference B−A of less than 10, which is the absolute value of the gloss difference between the printed portion and the non-printed portion under conditions without the corona discharge treatment, it is possible set the amount of the corona discharge at 0. Meanwhile, in the case of combinations of a paper substrate and an ink having a gloss difference B−A of 10 or more, a plurality of stages of a corona discharge that causes a decrease in the 60° gloss value of the printed portion B by the corona discharge treatment and allows practicable curability to be maintained can be each used depending on the combinations of a paper substrate and an ink.

Even when combinations of a paper substrate and an ink each have a different range of a usable corona discharge amount, some narrower ranges of the amount of the corona discharge may be used common for many of the combinations. Such a range is preferably a range of 5 W·min/m² or more and less than 200 W·min/m², more preferably a range of 10 W·min/m² or more and less than 150 W·min/m². One corona discharge amount, if selected from such a narrow range, may cover a plurality of combinations of a paper substrate and an ink. For example, the table can be set in such a manner that no corona discharge treatment is performed on substrates having a gloss difference B−A of less than 10 whereas the corona discharge treatment is performed with a predetermined discharge on substrates having a gloss difference B−A of 10 or more. Such a two-stage control is particularly preferred in the image forming method of the present invention because it was possible to prevent unnecessary corona discharge treatment from being performed on combinations of a paper substrate and an ink having a gloss difference B−A of less than 10.

It is preferred to store the table that correlates the type of paper substrates, type of inks to be used, and the amounts of the corona discharge with one another, as a program in the image forming apparatus. When such a program is stored in the apparatus, selecting the type of paper substrates and type of inks, before an image is formed, enables the apparatus to automatically set the amount of the corona discharge.

1-2. Landing Droplets of Ink on Paper Substrate

In the present step, droplets of the ink of the present invention are ejected from a nozzle of an inkjet head so as to be landed on a recording medium, and landed on the paper substrate surface.

The inkjet heads may be either of on-demand mode or continuous inkjet heads. Examples of the on-demand mode inkjet heads include electromechanical conversion-mode inkjet heads, such as single cavity-type, double cavity-type, bender-type, piston-type, shear mode-type, and shared wall-type, and electrothermal conversion-mode inkjet heads, such as thermal inkjet-type and Bubble Jet-type ("Bubble Jet" is a registered trademark of Canon Inc.).

The amount of the ink of the present invention to be landed on a paper substrate surface may be adjusted by changing the amount of the ink to be ejected from the nozzle, changing the number of nozzles to eject the ink, or the combination thereof. The amount of the ink to be ejected from the nozzle can be changed by changing the amplitude width of a piezoelectric element in an electromechanical conversion-mode inkjet head as described above, for example. The number of nozzles to eject the ink can be changed by inhibiting some nozzles of a plurality of nozzles included in the inkjet head from ejecting the ink, for example. The amount of the ink of the present invention to be landed on the paper substrate surface may be set at a desired value by changing the volume or number of droplets of the ink to be ejected from the inkjet head in this manner.

1-3. Curing Ink

In the present step, the ink of the present invention landed is irradiated with actinic radiation to cure the ink. From the viewpoint of enhancing the curability of the ink of the present invention, the ink is irradiated with actinic radiation preferably between 0.001 seconds or more and 1.0 seconds or less after the ink is landed, and from the viewpoint of forming a higher-definition image, more preferably between 0.001 seconds or more and 0.5 seconds or less.

Examples of the actinic radiation with which the ink can be irradiated in the present embodiment include electron beams, ultraviolet radiation, cc rays, y rays, and X rays. Of these, from the viewpoint of easy handling and less influence on human body, ultraviolet radiation is preferably directed. From the viewpoint of suppressing occurrence of curing failure of the ink due to melting of the ink of the present invention with radiant heat from a light source, the light source is preferably a light-emitting diode (LED). Examples of LED light sources that can direct actinic radiation to cure the ink of the present invention include 395 nm water-cooled LEDs manufactured by Phoseon Technology.

1-4. Ink of Present Invention

The ink of the present invention is an inkjet ink that contains a photocurable compound and a gelling agent and undergoes temperature-induced sol-gel phase transition, in which ink, the gelling agent is a gelling agent that has no polymerizable group and has an alkyl group having a linear portion having 12 or more and 26 or less carbon atoms. The ink of the present invention may further contain a photopolymerization initiator, a colorant, and other components.

1-4-1. Photocurable Compound

Examples of the photocurable compounds include radical polymerizable compounds and cationic polymerizable compounds. The photocurable compound, which crosslinks or polymerizes when irradiated with the actinic radiation as described above, has a function of curing an ink. The photocurable compound may be any of a monomer, polymerizable oligomer, prepolymer, and mixture thereof. Only one photocurable compound or two or more photocurable compounds may be contained in the ink of the present invention.

The content of the photocurable compound is, for example, preferably 1 mass % or more and 97 mass % or less based on the total mass of the ink of the present invention, from the viewpoint of film physical properties such as curability and flexibility, more preferably 30 mass % or more and 95 mass % or less.

The radical polymerizable compound is preferably an unsaturated carboxylate compound, more preferably a (meth)acrylate. In the present invention, a "(meth)acrylate" means an acrylate or methacrylate, a "(meth)acryloyl group" means an acryloyl group or methacryloyl group, and "(meth)acryl" means acryl or methacryl.

Examples of the (meth)acrylates include monofunctional acrylates including isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl-diglycol (meth)acrylate, 2-hydroxybutyl (meth)acrylate, 2-(meth)acryloyloxy ethyl hexahydrophthalate, butoxyethyl (meth)acrylate, ethoxy diethylene glycol (meth)acrylate, methoxy diethylene glycol (meth)

acrylate, methoxy polyethylene glycol (meth)acrylate, methoxy propylene glycol (meth)acrylate, phenoxyethyl (meth)acrylate, tetrahydrofuryl (meth)acrylate, isobornyl (meth)acrylate, 2-hydroxyethyl (meth)acrylate, 2-hydroxypropyl (meth)acrylate, 2-hydroxy-3-phenoxypropyl (meth) acrylate, 2-(meth)acryloyloxy ethyl succinate, 2-(meth)acryloyloxy ethyl phthalate, 2-(meth)acryloyloxyethyl-2-hydroxyethyl-phthalate, and t-butylcyclohexyl (meth)acrylate; bifunctional (meth)acrylates including triethylene glycol di(meth)acrylate, tetraethylene glycol di(meth)acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol-tricyclodecane di(meth)acrylate, di(meth)acrylate having a bisphenol A structure, hydroxy pivalic acid neopentyl glycol di(meth)acrylate, polytetramethylene glycol di(meth)acrylate, polyethylene glycol diacrylate, and tripropylene glycol diacrylate; trifunctional or higher functional (meth)acrylates including trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerin propoxy tri(meth)acrylate, and pentaerythritol ethoxy tetra(meth)acrylate; oligomers having a (meth)acryloyl group including polyester acrylate oligomers; and modified products thereof. Examples of the modified products described above include ethylene oxide-modified (EO-modified) acrylates including an ethylene oxide group inserted therein and propylene oxide-modified (PO-modified) acrylates including a propylene oxide inserted therein.

The photocurable compounds preferably include (meth)acrylate compounds having a molecular weight of 280 or more and 1,500 or less as well as a C log P value of 4.0 or more and 7.0 or less (hereinafter, also simply referred to as a "(meth)acrylate compounds A"). A (meth)acrylate compound A has preferably two or more (meth)acrylate groups.

The (meth)acrylate compound A has a molecular weight of 280 or more and 1,500 or less as described above, more preferably 300 or more and 800 or less. In order to stably eject the ink from an inkjet recording head, the ink viscosity at 80° C. can be set at 3 to 20 mPa·s, preferably 7 to 14 mPa·s. Incorporation of a (meth)acrylate compound having a molecular weight of 280 or more and a gelling agent in an ink composition can raise the ink viscosity after landing to thereby suppress permeation of the ink into the substrate, and thus an effect of preventing a decrease in the curability can be anticipated. Meanwhile, incorporation of a (meth)acrylate compound having a molecular weight of 1,500 or less can suppress an excessive increase in the sol viscosity of the ink, and thus an increase in the uniform gloss of a coated film can be anticipated.

The molecular weight of the (meth)acrylate compound A herein can be measured using the following commercially available software package 1 or 2.

Software package 1: MedChem Software (Release 3.54, August, 1991, Medicinal Chemistry Project, Pomona College, Claremont, Calif.), and Software package 2: Chem Draw Ultraver. 8.0. (April, 2003, Cambridge Soft Corporation, USA)

In the image forming method of the present invention, when the ink contains a (meth)acrylate compound A as at least a portion of the photocurable compound, the gloss value of the ink tends to fall below that of an ink containing a (meth)acrylate compound having a C log P value of less than 4.0 as the photocurable compound. Accordingly, the (meth)acrylate compound A is preferred because the compound A can reduce the gloss difference between the printed portion and the non-printed portion when used in an ink for forming an image on a substrate having a relatively low 60° gloss value before the corona discharge treatment. With the (meth)acrylate compound A, which has higher hydrophobicity that that of a (meth)acrylate compound having a C log P value of less than 4.0, it is considered that a larger portion of the gelling agent is repelled to thereby migrate to the cured film surface and increase the unevenness, leading to a reduction in the gloss value of the printed portion. Furthermore, the (meth)acrylate compound A preferably has a C log P value of 4.5 or more and 6.0 or less.

The term "Log P value" herein is a coefficient indicating the affinity of an organic compound to water and 1-octanol. The 1-octanol/water partition coefficient P is a partition equilibrium achieved when a trace amount of a compound is dissolved as a solute in a two-liquid phase solvent of 1-octanol and water, and the partition coefficient P is the ratio of equilibrium concentrations of the compound in the respective solvents, and is expressed as Log P, the logarithm to the base 10 of the partition coefficient. That is, the "log P value" is a logarithmic value of the partition coefficient of 1-octanol/water, and is known as an important parameter indicating the hydrophilicity and hydrophobicity of a molecule.

The term "C Log P value" is a Log P value determined by calculation. The C Log P value may be calculated by the fragment method, atomic approach method or the like. More specifically, in order to calculate the C log P value, the fragment method described in the literature (C. Hansch and A. Leo, "Substituent Constants for Correlation Analysis in Chemistry and Biology" (John Wiley & Sons, New York, 1969)) or commercially available software package 1 or 2 described below may be used.

Software package 1: MedChem Software (Release 3.54, August, 1991, Medicinal Chemistry Project, Pomona College, Claremont, Calif.), and Software package 2: Chem Draw Ultraver. 8.0. (April, 2003, Cambridge Soft Corporation, USA)

The numerical value of the C log P value described herein etc. is a "C log P value" calculated using software package 2.

The amount of the (meth)acrylate compound A contained in the ink is not particularly limited, and is preferably 1 mass % or more and 40 mass % or less, more preferably 5 mass % or more and 20 mass % or less, based on the total mass of the ink. With an amount of the (meth)acrylate compound A of 1 mass % or more, the ink does not become excessively hydrophilic, the gelling agent is sufficiently dissolved in the ink, and thus the ink is likely to undergo sol-gel phase transition. Meanwhile, with an amount of the (meth)acrylate compound A of 40 mass % or less, it is possible to sufficiently dissolve the photopolymerization initiator in the ink.

More preferred examples of the (meth)acrylate compound A include (1) a trifunctional or higher functional methacrylate or amylate compound having 3 to 14 structures each represented by (—C(CH$_3$)H—CH$_2$—O—) in the molecule, and (2) a bifunctional or higher functional methacrylate or acrylate compound with a functionality of 2 or more and having a cyclic structure in the molecule. These (meth)acrylate compounds have high photocurability and reduced shrinkage when cured. These compounds further have high reproducibility of sol-gel phase transition.

Examples of the trifunctional or higher functional methacrylate or acrylate compound having 3 to 14 structures each represented by (—C(CH$_3$)H—CH$_2$—O—) in the molecule include a compound obtained by modifying a hydroxyl group of a compound having three or more hydroxyl groups with propylene oxide and esterifying the obtained modified product with (meth)acrylic acid. Specific examples of the compound include:

3PO-modified trimethylolpropane triacrylate Photomer 4072 (molecular weight: 471, Photomer 4072 (molecular weight: 471, C log P: 4.90, manufactured by Cognis), and 3PO-modified trimethylolpropane triacrylate Miramer M360 (molecular weight: 471, C log P: 4.90, manufactured by Miwon Specialty Chemical Co., Ltd.).

Examples of the bifunctional or higher functional methacrylate or acrylate compound having a cyclic structure in the molecule include a compound obtained by esterifying a hydroxyl group of a compound having two or more hydroxyl groups and tricycloalkane with (meth)acrylic acid. Specific examples of the compound include:

Tricyclodecane dimethanol diacrylate NK ESTER A-DCP (molecular weight: 304, C log P: 4.69), and Tricyclodecane dimethanol dimethacrylate NK ESTER DCP (molecular weight: 332, C log P: 5.12).

Other specific examples of the (meth)acrylate compound A include 1,10-decanediol dimethacrylate NK ESTER DOD-N (molecular weight: 310, C log P: 5.75, manufactured by Shin-Nakamura Chemical Co., Ltd.).

The photocurable compound may further contain a photocurable compound other than the (meth)acrylate compound A. Examples of other photocurable compounds include (meth)acrylate monomers or oligomers having a C log P value of less than 4.0, (meth)acrylate monomers or oligomers having a C log P value of more than 7.0, and other polymerizable oligomers.

Examples of these (meth)acrylate monomers or oligomers include 4EO-modified hexanediol diacrylate (CD561, manufactured by Sartomer Company, Inc., molecular weight: 358); 3EO-modified trimethylolpropane triacrylate (SR454, manufactured by Sartomer Company, Inc., molecular weight: 429); 4EO-modified pentaerythritol tetraacrylate (SR494, manufactured by Sartomer Company, Inc., molecular weight: 528); 6EO-modified trimethylolpropane triacrylate (SR499, manufactured by Sartomer Company, Inc., molecular weight: 560); caprolactone acrylate (SR495B, manufactured by Sartomer Company, Inc.); polyethylene glycol diacrylate (NK ESTER A-400, manufactured by Shin-Nakamura Chemical Co., Ltd., molecular weight: 508), (NK ESTER A-600, manufactured by Shin-Nakamura Chemical Co., Ltd., molecular weight: 708); polyethylene glycol dimethacrylate (NK ESTER 9G, manufactured by Shin-Nakamura Chemical Co., Ltd., molecular weight: 536), (NK ESTER 14G, manufactured by Shin-Nakamura Chemical Co., Ltd.); tetraethylene glycol diacrylate (V #335HP, manufactured by OSAKA ORGANIC CHEMICAL INDUSTRY LTD., molecular weight: 302); stearyl acrylate (STA, manufactured by OSAKA ORGANIC CHEMICAL INDUSTRY LTD.); phenol EO-modified acrylate (M144, manufactured by Miwon Specialty Chemical Co., Ltd.); and nonyl phenol EO-modified acrylate (M166, manufactured by Miwon Specialty Chemical Co., Ltd.).

Examples of the other polymerizable oligomers include epoxy acrylate, aliphatic urethane acrylate, aromatic urethane acrylate, polyester acrylate, and straight-chain acrylic oligomers.

Examples of the cationic polymerizable compounds to be used as a photocurable compound may include epoxy compounds, vinyl ether compounds, and oxetane compounds. Only one cationic polymerizable compound or two or more cationic polymerizable compound may be contained in an actinic radiation curable inkjet white ink.

The epoxy compound is an aromatic epoxide, alicyclic epoxide, aliphatic epoxide, or the like, and in order to improve the curability, aromatic epoxides and alicyclic epoxides are preferred.

The aromatic epoxide may be a di- or polyglycidyl ether produced via reaction of a polyphenol or alkylene oxide adduct thereof with epichlorohydrin. Examples of the polyphenol or alkylene oxide adduct thereof to be reacted include bisphenol A or alkylene oxide adducts thereof. The alkylene oxide in an alkylene oxide adduct may be ethylene oxide, propylene oxide or the like.

The alicyclic epoxide may be a cycloalkane oxide-containing compound produced by epoxidizing a cycloalkane-containing compound with an oxidant such as hydrogen peroxide or peracid. The cycloalkane in a cycloalkane oxide-containing compound may be cyclohexene or cyclopentene.

The aliphatic epoxide may be a di- or polyglycidyl ether produced via reaction of an aliphatic polyol or alkylene oxide adduct thereof with epichlorohydrin. Examples of the aliphatic polyols include alkylene glycols such as ethylene glycol, propylene glycol, and 1,6-hexane diol. The alkylene oxide in an alkylene oxide adduct may be ethylene oxide, propylene oxide or the like.

Examples of the vinyl ether compounds include monovinyl ether compounds such as ethyl vinyl ether, n-butyl vinyl ether, isobutyl vinyl ether, octadecyl ethyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl vinyl ether-o-propylene carbonate, dodecyl vinyl ether, diethylene glycol monovinyl ether, and octadecyl vinyl ether; and di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexane diol divinyl ether, cyclohexane dimethanol divinyl ether, and trimethylolpropane trivinyl ether. Of these vinyl ether compounds, in consideration of curability and adhesion, di- or trivinyl ether compounds are preferred.

An oxetane compound is a compound having an oxetane ring, and examples thereof include oxetane compounds described in Japanese Patent Application Laid-Open Nos. 2001-220526, 2001-310937, and No. 2005-255821. Of these, included are the compound represented by the general formula (1) described in paragraph 0089 of Japanese Patent Application Laid-Open No. 2005-255821, the compound represented by the general formula (2) described in paragraph 0092, the compound represented by the general formula (7) described in paragraph 0107, the compound represented by the general formula (8) described in paragraph 0109, and the compound represented by the general formula (9) described in paragraph (0166) of the same literature. The general formulas (1), (2), (7), (8), and (9) described in Japanese Patent Application Laid-Open No. 2005-255821 are shown below.

[Formula 1]

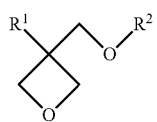

General Formula (1)

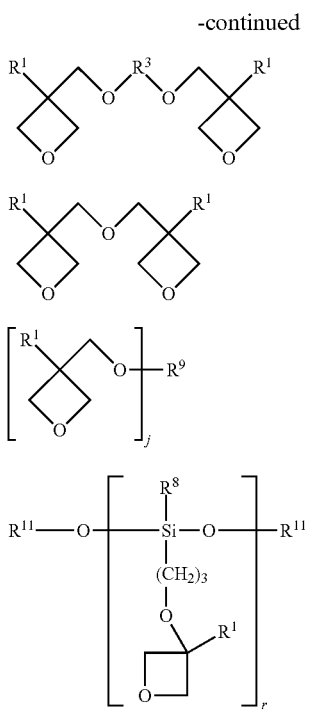

General Formula (2)

General Formula (7)

General Formula (8)

General Formula (9)

1-4-2. Gelling Agent

A gelling agent used in the present invention is a gelling agent having no polymerizable group. Such gelling agents are not particularly limited so long as they have an alkyl group having a linear portion of 12 or more and 26 or less carbon atoms. When such a gelling agent has an alkyl group having a linear portion of 12 or more carbon atoms, it is possible to make the gelling agent sufficiently hydrophobic and adjust the gloss by controlling migration of the gelling agent described above. When the gelling agent has an alkyl group having a linear portion of 12 or more carbon atoms, it is also possible to enhance the curability of the ink by effectively suppressing oxygen inhibition in radical polymerization reaction. When the gelling agent has an alkyl group having 26 or less carbon atoms, it is possible to suppress ejection failure due to an excessive increase in the viscosity of the ink caused by the gelling agent.

The content of the gelling agent is preferably 0.5 mass % or more and 10.0 mass % or less based on the total mass of the ink. When the content of gelling agent is set at 0.5 mass % or more, it is possible to sufficiently enhance the pinning properties of the ink to thereby form a higher definition image. When the content of the gelling agent is set at 10.0 mass % or less, the gelling agent is less likely to precipitate on the surface of an image formed. Additionally, it is possible to make the gloss of the image closer to the gloss of the paper substrate and to enhance the ink ejectability from an inkjet head. From the above viewpoint, the content of the gelling agent in the ink of the present invention is preferably 0.5 mass % or more and 5.0 mass % or less, more preferably 0.5 mass % or more and 3.0 mass % or less, still more preferably 0.8 mass % or more and 2.8 mass % or less.

Additionally, from the viewpoint below, the gelling agent is preferably crystallized in the ink at a temperature equal to or lower than the gelling temperature of the ink. When the gelling agent is crystallized in the ink, there may be formed a structure in which the photocurable compound is encapsulated in a three-dimensional space formed by the gelling agent crystallized in a plate form (such a structure is referred to as a "card house structure" hereinafter). When a card house structure is formed, the liquid photocurable compound is retained in the space, and thus the ink droplets are less likely to wet spread to thereby further enhance the pinning properties of the ink. With enhanced pinning properties of the ink, the ink droplets landed on the recording medium are less likely to coalesce to one another to thereby enable formation of a higher definition image.

In order to form a card house structure, the photocurable compound and the gelling agent, which are dissolved in the ink, are preferably compatible each other. In contrast, when the photocurable compound and the gelling agent dissolved in the ink are phase-separated from each other, it may be difficult to form a card house structure.

Examples of the gelling agents suitable for formation of the card house structure by crystallization include ketone waxes, ester waxes, plant waxes, animal waxes, mineral waxes, hydrogenated castor oil, modified waxes, higher fatty acids, higher alcohols, hydroxystearic acid, fatty acid amides including N-substituted fatty acid amides and specialty fatty acid amides, higher amines, esters of sucrose fatty acids, synthetic waxes, dibenzylidene sorbitols, dimeric acid, and dimer diols.

Examples of the ketone waxes include dilignoceryl ketone, dibehenyl ketone, distearyl ketone, dieicosyl ketone, dipalmityl ketone, dilauryl ketone, dimyristyl ketone, myristyl palmityl ketone, and palmityl stearyl ketone Examples of the ester waxes include behenyl behenate, icosyl icosanoate, stearyl stearate, palmityl stearate, cetyl palmitate, myristyl myristate, cetyl myristate, myricyl cerotate, stearyl stearate, oleyl palmitate, glycerin fatty acid esters, sorbitan fatty acid esters, propylene glycol fatty acid esters, ethylene glycol fatty acid esters, and polyoxyethylene fatty acid esters.

Examples of commercially available products of the ester waxes include EMALLEX series manufactured by Nihon Emulsion Co., Ltd. ("EMALEX" is a registered trademark of the company.) and RIKEMAL series and POEM series manufactured by Riken Vitamin Co., Ltd. (both "RIKEMAL" and "POEM" are registered trademarks of the company).

Examples of the petroleum waxes include petroleum waxes including paraffin wax, microcrystalline wax, and petrolatum.

Examples of the plant waxes include candelilla wax, carnauba wax, rice wax, sumac wax, jojoba oil, solid jojoba wax, and jojoba ester.

Examples of the animal waxes include beeswax, lanolin, and spermaceti.

Examples of the mineral waxes include montan wax and hydrogenated wax.

Examples of the modified waxes include montan wax derivatives, paraffin wax derivatives, microcrystalline wax derivatives, 12-hydroxystearic acid derivatives, and polyethylene wax derivatives.

Examples of the higher fatty acids include behenic acid, arachidic acid, stearic acid, palmitic acid, myristic acid, lauric acid, oleic acid, and erucic acid.

Examples of the higher alcohols include stearyl alcohol and behenyl alcohol.

Examples of the hydroxystearic acids include 12-hydroxystearic acid.

Examples of the fatty acid amides include lauric acid amide, stearic acid amide, behenic acid amide, oleic acid amide, erucic acid amide, ricinoleic acid amide, and 12-hydroxystearic acid amide.

Examples of commercially available products of the fatty acid amides include NIKKA AMIDE series manufactured by Nippon Kasei Chemical Co., Ltd. ("NIKKA AMIDE" is a registered trademark of the company.), ITOWAX series manufactured by Ito Oil Chemicals Co., Ltd., and FATTY AMID series manufactured by Kao Corporation.

Examples of the N-substituted fatty acid amides include N-stearyl stearic acid amide and N-oleyl palmitic acid amide.

Examples of the specialty fatty acid amides include N,N'-ethylene bisstearylamide, N,N'-ethylene bis-12-hydroxystearylamide, and N,N'-xylylene bisstearylamide.

Examples of the higher amines include dodecylamine, tetradecylamine, and octadecylamine Examples of the esters of sucrose fatty acids include sucrose stearic acid and sucrose palmitic acid.

Examples of commercially available products of the esters of sucrose fatty acids include RYOTO Sugar Ester series manufactured by Mitsubishi-Kagaku Foods Corporation ("RYOTO" is a registered trademark of the company.).

Examples of the synthetic waxes include polyethylene wax and α-olefin-maleic anhydride copolymer wax.

Examples of commercially available products of the synthetic waxes include UNILIN series manufactured by Baker-Petrolite ("UNILIN" is a registered trademark of the company.).

Examples of dibenzylidene sorbitols include 1,3:2,4-bis-O-benzylidene-D-glucitol.

Examples of commercially available products of the dibenzylidene sorbitols include GELOL D manufactured by New Japan Chemical Co., Ltd. ("GELOL" is a registered trademark of the company.).

Examples of commercially available products of the dimer diols include PRIPOR series manufactured by CRODA International Plc ("PRIPOR" is a registered trademark of the company.).

Of these gelling agents, from the viewpoint of enhancing the pinning properties, ketone waxes, ester waxes, higher fatty acids, higher alcohols, and fatty acid amides are preferred.

Additionally, from the viewpoint of enhancing the degree of hydrophobicity and more easily adjusting the gloss described above, of these gelling agents, ketone waxes represented by the following general formula (G1) and ester waxes represented by the following general formula (G2) are more preferred. Only one of ketone waxes represented by the following general formula (G1) and ester waxes represented by the following general formula (G2) or two or more of these may be contained in the ink of the present invention. Only either one of or both the ketone wax represented by the following general formula (G1) and the ester wax represented by the following general formula (G2) may be contained in the ink of the present invention.

$$R1\text{-}CO\text{-}R2 \qquad \text{General formula (G1):}$$

In the general formula (G1), R1 and R2 each independently represent an alkyl group that contains a linear portion having 12 or more and 26 or less carbon atoms and optionally contains a branch.

$$R3\text{-}COO\text{-}R4 \qquad \text{General formula (G2):}$$

In the general formula (G2), R3 and R4 each independently represent an alkyl group that contains a linear portion having 12 or more and 26 or less carbon atoms and optionally contains a branch.

As a result of an investigation, the present inventor has found that the ketone wax represented by the above general formula (G1) or ester wax represented by the above general formula (G2) is characteristic of having a relatively high crystallinity and thus the gloss and curability are slightly changed depending on the printing environment. Specifically, even when the substrate temperature after landing has been changed to a certain degree, the ink containing the gelling agent described above gives a slight change in the glossiness and curability with respect to variations in the substrate temperature to thereby enable stable formation of an image. The reason for the high crystallinity seems to be as follows: the gelling agent has a long linear chain structure, and in the stage of crystal growth, the interaction among molecules is large to thereby allow crystals to easily grow.

The ketone wax represented by the above general formula (G1) or ester wax represented by the above general formula (G2) has a high crystallinity as a gelling agent and results in a more sufficient space in the card house structure described above. For this reason, the photocurable compound is more likely to be sufficiently encapsulated in the space and the pinning properties of the ink are further enhanced R1 and R2 are each particularly preferably a linear hydrocathon group having 15 or more and less than 23 carbon atoms.

From the viewpoint of raising the gelling temperature of the ink and making the ink to be rapidly gelled after landed, either of R1 or R2 or either of R3 or R4 is preferably a saturated hydrocarbon group having 15 or more and less than 23 carbon atoms. From the above viewpoint, both R1 and R2 or both R3 and R4 are each more preferably a hydrocathon group having 15 or more and less than 23 carbon atoms.

Examples of the ketone waxes represented by the above general formula (G1) include dilignoceryl ketone (number of carbon atoms: 23-24), dibehenyl ketone (number of carbon atoms: 21-22), distearyl ketone (number of carbon atoms: 17-18), dieicosyl ketone (number of carbon atoms: 19-20), dipalmityl ketone (number of carbon atoms: 15-16), dimyristyl ketone (number of carbon atoms: 13-14), myristyl palmityl ketone (number of carbon atoms: 13-16), myristyl stearyl ketone (number of carbon atoms: 13-18), myristyl behenyl ketone (number of carbon atoms: 13-22), palmityl stearyl ketone (number of carbon atoms: 15-18), palmityl behenyl ketone (number of carbon atoms: 15-22), and stearyl behenyl ketone (number of carbon atoms: 17-22). The numbers of carbon atoms in the above parentheses each represent the number of carbon atoms of each of two hydrocarbon groups separated by the carbonyl group.

Examples of commercially available products of the ketone waxes include 18-Pentatriacontanon and Hentriacontan-16-on manufactured by Alfa Aeser and KAO Wax T1 manufactured by Kao Corporation.

Examples of the fatty acid or ester waxes represented by the above general formula (G2) include behenyl behenate (number of carbon atoms: 21-22), icosyl icosanoate (number of carbon atoms: 19-20), stearyl stearate (number of carbon atoms: 17-18), palmityl stearate (number of carbon atoms: 17-16), lauryl stearate (number of carbon atoms: 17-12), cetyl palmitate (number of carbon atoms: 15-16), stearyl palmitate (number of carbon atoms: 15-18), myristyl myristate (number of carbon atoms: 13-14), cetyl myristate (number of carbon atoms: 13-16), octyldodecyl myristate (number of carbon atoms: 13-20), stearyl oleate (number of carbon atoms: 17-18), stearyl erucate (number of carbon atoms: 21-18), stearyl linoleate (number of carbon atoms: 17-18), behenyl oleate (number of carbon atoms: 18-22), and arachidyl linoleate (number of carbon atoms: 17-20). The numbers of carbon atoms in the above parentheses each represent the number of carbon atoms of each of two hydrocarbon groups separated by the ester group.

Examples of commercially available products of the ester waxes represented by the general formula (G2) include UNISTAR M-2222SL and SPERMACETI manufactured by NOF Corporation ("UNISTAR" is a registered trademark of the company.), EXCEPARL SS and EXCEPARL MY-M manufactured by Kao Corporation ("EXCEPARL" is a registered trademark of the company.), EMALEX CC-18 and EMALEX CC-10 manufactured by NIHON EMULSION Co., Ltd. ("EMALEX" is a registered trademark of the company.), and AMREPS PC manufactured by Kokyu Alcohol Kogyo Co., Ltd. ("AMREPS" is a registered trademark of the company.). These commercially available products, which are often mixtures of two or more esters, may be separated and purified before added to the ink.

1-4-3. Other Components

The ink of the present invention may additionally contain other components including a photopolymerization initiator, colorant, dispersing agent, photosensitizer, polymerization inhibitor, and surfactant in the range where the effect of the present invention can be achieved. Only one of these components or two or more of these may be contained in the ink of the present invention.

As the photopolymerization initiator, when the photocurable compound is a compound having a radical polymerizable functional group, a photo-radical initiator is included. When the photocurable compound is a compound having a cationic polymerizable functional group, a photoacid generating agent is included. Only one photopolymerization initiator or two or more photopolymerization initiators may be contained in the ink of the present invention. The photopolymerization initiator may be a combination of both of a photo-radical initiator and a photoacid generating agent.

The photo-radical initiator includes a cleaving-type radical initiator and a hydrogen withdrawing-type radical initiator.

Examples of the cleaving-type radical initiator include acetophenone initiators, benzoin initiators, acyl phosphine oxide initiators, benzyl, and methylphenyl glyoxy ester.

Examples of the hydrogen withdrawing-type radical initiator include benzophenone initiators, thioxanthone initiators, aminobenzophenone initiators, 10-butyl-2-chloro acridone, 2-ethyl anthraquinone, 9,10-phenanthrene quinone, and camphor quinone.

Examples of the photoacid generating agent include the compounds described in pages 187-192 of "Imaging Yo Yuki Zailyo" edited by Yuki Electronics Zairyo Kenkyukai and published by Bunshin Shuppan (1993).

The content of the photopolymerization initiator is only required to be in a range such that the ink can be sufficiently cured, and for example, can be 0.01 mass % or more and 10 mass % or less based on the total mass of the ink of the present invention.

Colorants include dyes and pigments. From the viewpoint of obtaining an image having satisfactory weatherability, the colorant is preferably a pigment. The pigment can be selected from, for example, yellow pigments, red or magenta pigments, blue or cyan pigments, and black pigments, depending on the color and the like of an image to be formed.

1-4-4. Physical Properties

From the viewpoint of enhancing the ejectability from inkjet heads, the viscosity of the ink of the present invention at 80° C. is preferably 3 mPa·s or more and 20 mPa·s or less. From the viewpoint of allowing the ink to gel sufficiently when the temperature decreases to normal temperature after landing, the viscosity of the ink of the present invention at 25° C. is preferably 1,000 mPa·s or more.

The gelling temperature of the ink according to the present invention is preferably 40° C. or more and less than 100° C. When the gelling temperature of the ink is 40° C. or more, the ink immediately gels after landing on a recording medium, and thus the pinning properties are further enhanced. When the gelling temperature of the ink is less than 100° C., it is possible to eject the ink that has gelled by heating from inkjet heads to thereby enable the ink to be ejected in a more stable manner. From the viewpoint of enabling the ink to be ejected at a lower temperature and reducing the load on the image forming apparatus, the gelling temperature of the ink of the present invention is preferably 40° C. or more and less than 70° C.

The viscosity at 80° C., viscosity at 25° C., and gelling temperature of the ink of the present invention can be determined by measuring temperature-dependent changes in dynamic viscoelasticity of the ink with a rheometer. In the present invention, the viscosities and gelling temperature are values obtained by the following method. The ink of the present invention is heated to 100° C. and then cooled to 20° C. under conditions of a shear rate of 11.7 (1/s) and a temperature lowering rate of 0.1° C./s while the viscosity is measured with a stress-controlled rheometer Physica MCR 301 (cone plate diameter: 75 mm, cone angle: 1.0°) manufactured by Anton Paar GmbH, and thus a temperature-dependent viscosity change curve is obtained. The viscosity at 80° C. and the viscosity at 25° C. can be determined by reading the viscosity each at 80° C. and 25° C. on the temperature-dependent viscosity change curve. The gelling temperature can be determined as a temperature at which the viscosity reaches 200 mPa·s on the temperature-dependent viscosity change curve.

From the viewpoint of enhancing the ejectability from inkjet heads, when the ink of the present invention contains a pigment, it is preferred that the average particle size of pigment particles be 0.08 μm or more and 0.5 μm or less and the maximum particle size be 0.3 μm or more and 10 μm or less. The average particle size of pigment particles of the present invention means a value determined by the dynamic light scattering method using Zetasizer Nano ZSP manufactured by Malvern Instruments Ltd. A colorant-containing ink is highly dense, and this measurement apparatus cannot transmit light through such an ink. Then, the measurement is performed after diluting the ink 200 times. The measurement temperature is set to normal temperature (25° C.).

2. Image Forming Apparatus

Figure 2A:
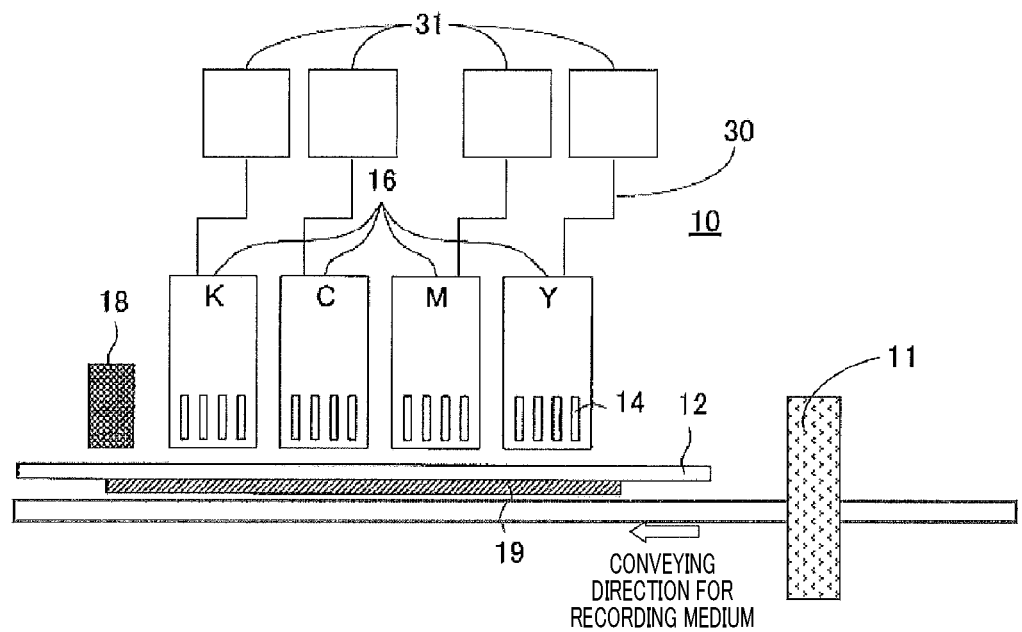
FIG. 2A is a side view of one example of the configuration of the main part of a line recording-type inkjet printer containing a corona discharge treatment section.
Figure 2B:
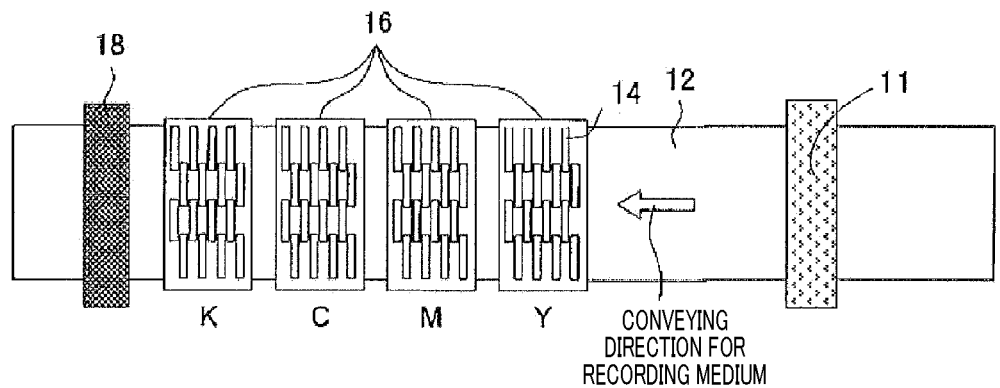
FIG. 2B is a top view thereof.

Another embodiment of the present invention relates to an inkjet image forming apparatus with which the aspect that include a step for performing surface treatment of a paper substrate among the method described above can be implemented. FIG. 2A is a side view of one example of the configuration of the main part of a line recording-type inkjet printer containing a corona discharge treatment section. FIG. 2B is a top view thereof. Hereinafter, the line recording-type inkjet printer will be described, but the present embodiment may apply to a scan-type inkjet printer.

As shown in FIGS. 2A and 2B, inkjet printer 10 has corona discharge treatment section 11 disposed upstream (in the conveying direction for recording medium), head carriages 16 that accommodate a plurality of inkjet recording heads 14, and actinic radiation irradiation section 18 that covers the entire width of recording medium 12 and is disposed downstream of head carriages 16 (in the conveying direction for recording medium). Inkjet printer 10 may further have temperature control section 19 disposed on the backside of recording medium 12.

Corona discharge treatment section 11 is not particularly limited so long as section 11 is capable of performing the corona discharge treatment. Any known apparatus can be used, but preferred is a corona treatment apparatus that includes a treatment station composed of at least electrodes and a dielectric. In the corona discharge treatment section, as the electrodes, metal electrodes, ceramic electrodes and the like can be used. As the dielectric, rolls made of silicone, ceramic, stainless and the like can be used.

As the power source necessary for discharging, commercially available high-frequency power sources can be used as appropriate, depending on the degree of a treatment required. The maximum output power required from such a power source is not particularly limited. When a productivity of 10 m/min or more is necessary for surface treatment, a power source of about 2 kW to 5 kW is preferably used.

Ancillary facilities for the corona treatment apparatus are not particularly limited and include a static eliminator for removing static electricity to be generated, an exhaust facility for exhausting high concentration ozone, and an ozonolysis apparatus, for example.

Figure 3:
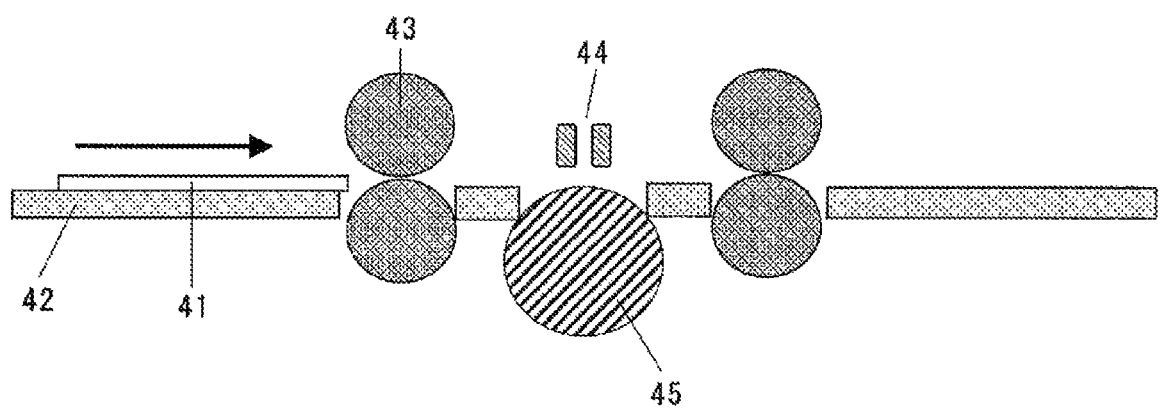
FIG. 3 is a side view of the corona discharge treatment section.

The corona treatment apparatus is only required to be positioned in the front side of the ink ejection section, which will be a printed portion, in the inkjet recording apparatus. A method for treating and conveying a sheet substrate is not particularly limited. For example, a corona discharge treatment section as shown in FIG. 3 can be used. In the corona discharge treatment section of FIG. 3, rotating feed rollers 43 have a certain elasticity, while both the ends of paper substrate 41 on stage 42 are held vertically between rollers 43, enables the substrate to be treated while conveyed in the conveying direction. Thereafter, this discharging treatment is performed by electrodes 44 and dielectric 45.

A commercially available corona unit also may be connected to the printer. For example, a Digi Co-Primer manufactured by BN Technology Corporation and the like may be used.

Head carriages 16 are each connected to each ink tank 31 that stores an ink via ink flow path 30. Head carriages 16, which are fixedly disposed so as to cover the entire width of recording medium 12, each accommodate a plurality of inkjet recording heads 14 provided for each color. Inkjet recording heads 14 are supposed to be supplied with inks. For example, an ink may be supplied, directly or via an ink supply section, from an ink cartridge (not shown) detachably attached in inkjet printer 10 or the like.

The plurality of inkjet recording heads 14 for each color are disposed in the conveying direction for recording medium 12. The number of inkjet recording heads 14 to be disposed in the conveying direction for recording medium 12 is determined with the nozzle density of inkjet recording head 14 and the resolution of an image to be printed. For example, when an image having a resolution of 1,440 dpi is formed by using inkjet recording heads 14 having a droplet volume of 2 pl and a nozzle density of 360 dpi, four recording heads for ejection 14 may be disposed in a shifted manner relative to the conveying direction for recording medium 12.

When an image having a resolution of 720×720 dpi is formed by using inkjet recording heads 14 having a droplet volume of 6 pl and a nozzle density of 360 dpi, two inkjet recording heads 14 may be disposed in a shifted manner. Dpi represents the number of ink droplets (dots) per 2.54 cm.

Actinic radiation irradiation section 18 covers the entire width of recording medium 12 and is disposed downstream of head carriages 16 with respect to the conveying direction for the recording medium. Actinic radiation irradiation section 18 irradiates the droplets which have been ejected from inkjet recording heads 14 and landed on the recording medium 12 with actinic radiation so as to cure the droplets.

When the actinic radiation is ultraviolet radiation, examples of the actinic irradiation section 18 (ultraviolet radiation section) include fluorescent tubes (e.g., low-pressure mercury lamps and germicidal lamps), cold cathode tubes, UV laser, low-, medium-, or high-pressure mercury lamps having an operating pressure of several hundred Pa or less and 1 MPa or less, a metal halide lamp, and LEDs. From the viewpoint of curability, an ultraviolet radiation irradiation section that directs ultraviolet radiation having an illuminance of 100 mW/cm$^2$ or more, specifically a high-pressure mercury lamp, a metal halide lamp, an LED, or the like is preferred. The ultraviolet radiation irradiation section is particularly preferably an LED, from the viewpoint of low power consumption and additionally lower radiant heat. Specific examples of LEDs as the ultraviolet radiation irradiation section include 395 nm water-cooled LEDs manufactured by Phoseon Technology.

When the actinic radiation is electron beams, examples of actinic irradiation section 18 (electron beam radiation section) include electron beam radiation sections using a scanning method, curtain beam method, or broad beam method. From the viewpoint of processing capacity, an electron beam radiation section using the curtain beam method is preferred. Examples of the electron beam radiation section include "CURETRON EBC-200-20-30" manufactured by NHV Corporation and "Min-EB" manufactured by AIT.

Temperature control section 19 is disposed on a backside of recording medium 12 and maintains recording medium 12 at a predetermined temperature. Temperature control section 19 may be various heaters or the like, for example.

Hereinafter, an image recording method using line recording-type inkjet printer 10 is described. Corona discharge treatment section 11 is used to modify the surface of recording medium 12 having a 60° gloss value of 5 or more and 50 or less. Thereafter, recording medium 12 is conveyed to between head carriages 16 of inkjet printer 10 and temperature control section 19. Meanwhile, recording medium 12 is adjusted to a predetermined temperature by temperature control section 19. Subsequently, the ink at a high temperature is ejected from inkjet recording head 14 of head carriage 16 and attached to (landed on) recording medium 12. Then, the ink droplets attached to recording medium 12 are cured by irradiation with actinic radiation by actinic radiation irradiation section 18.

In order to enhance the ink ejectability when the ink is ejected from inkjet recording head 14, the ink temperature in inkjet recording head 14 is set preferably at a temperature higher than the gelling temperature of the ink by 10° C. or more and 30° C. or less. If an ink temperature in inkjet recording head 14 is less than (gelling temperature+10)° C., the ink undergoes gelation in inkjet recording head 14 or on the surface of a nozzle, and thus the ink ejectability is likely to be reduced. In contrast, if the ink temperature in inkjet recording head 14 exceeds (gelling temperature +30)° C., an excessively high temperature of the ink may cause degradation of ink components.

The droplet volume of a droplet ejected from each nozzle of inkjet recording head 14, which depends on the resolution of an image, is preferably 0.5 pl or more and 10 pl or less, more preferably 1 pl or more and 4.0 pl or less for formation of a high-resolution image.

In order to prevent neighboring ink droplets from coalescing, actinic radiation from actinic radiation irradiation section 18 is directed within 10 seconds after attachment of the ink droplets to a recording medium, preferably within 0.001 seconds or more and 5 seconds or less, more preferably within 0.01 seconds or more to 2 seconds or less. Actinic radiation is preferably directed after the inks are ejected from all the inkjet recording heads 14 accommodated in head carriages 16.

When actinic radiation is electron beams, the accelerating voltage of the electron beam radiation is preferably 30 kV or more and 250 kV or less, more preferably 30 kV or more and 100 kV or less, for sufficient curing. When the accelerating voltage is 100 kV or more and 250 kV or less, the irradiation dose of the electron beam is preferably 30 kGy or more and 100 kGy or less, more preferably 30 kGy or more and 60 kGy or less.

The total film thickness after ink curing is preferably from 2 µm or more and 25 µm or less. The term "total film thickness" refers to a maximum film thickness of the cured product of the inks landed on a recording medium.

EXAMPLES

Hereinafter, the present invention will be described specifically by way of examples and comparative examples, but the present invention is not construed to be limited by these examples. The sign "%" used in the examples refer to "mass %" unless otherwise specified.

1. Preparation of Pigment Dispersion

Pigment dispersions of yellow (Y), magenta (M), cyan (C), and black (K) were prepared in accordance with the following procedure.

(Preparation of Y Pigment Dispersion)

Two compounds below were placed in a stainless beaker, and heated, stirred, and dissolved for an hour while heated on a hot plate at 65° C.

Pigment dispersant: PB824 (manufactured by Ajinomoto Fine-Techno Co., Inc.) 9 parts by weight Photocurable compound: tripropylene glycol diacrylate 71 parts by weight Subsequently, after the solution described above cooled to room temperature, 20 parts of a yellow (Y) pigment below was added to the solution. The mixture, along with 200 g of zirconia beads having a diameter of 0.5 mm, was placed in a glass jar, which was then hermetically sealed. The mixture was dispersion-treated by means of a paint shaker for 8 hours. Thereafter, the zirconia beads were removed to obtain a Y pigment dispersion. Yellow pigment: Pigment Yellow 180 (manufactured by Dainichiseika Color & Chemicals Mfg. Co., Ltd., CHROMOFINE YELLOW 6280JC)

(Preparation of M Pigment Dispersion)

An M pigment dispersion was prepared in the same manner as for the Y pigment dispersion except that the Y pigment was replaced by a magenta (M) pigment below.

Magenta pigment: Pigment Red 122 (manufactured by Dainichiseika Color & Chemicals Mfg. Co., Ltd., CHROMOFINE RED 6112JC)

(Preparation of C Pigment Dispersion)

A C pigment dispersion was prepared in the same manner as for the Y pigment dispersion except that the Y pigment was replaced by a cyan (C) pigment below.

Cyan pigment: Pigment Blue 15:4 (manufactured by Dainichiseika Color & Chemicals Mfg. Co., Ltd., CHROMOFINE BLUE 6332JC)

(Preparation of K Pigment Dispersion)

A K pigment dispersion was prepared in the same manner as for the Y pigment dispersion except that the Y pigment was replaced by a black (K) pigment below.

Black pigment: Pigment Black 7 (manufactured by Mitsubishi Chemical Corporation, #52)

Examples 1 to 3 and Comparative Examples 1 to 3

1. Preparation of Inks C1 to C6

The following components and the C pigment dispersion described above were mixed in accordance with the ink compositions listed in the following Table 1, and each mixture was heated to 80° C. and stirred. The solutions obtained each were filtered with a Teflon (registered trademark) membrane filter (3 µm) manufactured by Advantec Toyo Kaisha, Ltd. under heating and cooled to obtain inks C1 to C3 of Examples and inks C4 to C6 of Comparative Examples.

The contents of the components in Table 1 are each expressed in mass %.

(Materials for Inks)

[Gelling Agent]

Distearyl ketone (KAO Wax T1: manufactured by Kao Corporation, number of carbon atoms: 17-17)

Behenyl behenate (UNISTAR M-2222SL: manufactured by NOF Corporation, number of carbon atoms: 21-22)

Lauryl acid amide (Diamide Y: manufactured by Nippon Kasei Chemical Co., Ltd., number of carbon atoms: 12)

Glycerin monocaprate (POEM M200: manufactured by Riken Vitamin Co., Ltd., number of carbon atoms: 10)

Behenyl acrylate (BLEMMER VA: manufactured by NOF Corporation, number of carbon atoms: 22, containing a polymerizable group)

The numbers of carbon atoms in the parentheses of distearyl ketone each represent the number of carbon atoms of each of two hydrocarbon groups separated by the carbonyl group. The numbers of carbon atoms in the parentheses of behenyl behenate each represent the number of carbon atoms of each of two hydrocarbon groups separated by the ester group.

[(Meth)acrylate Compound A]

3PO-modified trimethylolpropane triacrylate (Miramer M360: manufactured by Miwon Specialty Chemical Co., Ltd.) (molecular weight: 470, C log P value: 4.9)

[Other Photocurable Compounds]

Polyethylene glycol #400 diacrylate (NK ESTER A-400: manufactured by Shin-Nakamura Chemical Co., Ltd.) (molecular weight: 508, C log P value: 0.5)

6EO-modified trimethylolpropane triacrylate (SR499: manufactured by Sartomer Company, Inc.) (molecular weight: 428, C log P value: 3.6)

[Other Additives]

(Polymerization Inhibitor)

Irgastab UV10 (manufactured by BASF SE)

(Photopolymerization Initiator)

DAROCUR TPO (manufactured by BASF SE)

IRGACURE 819 (manufactured by BASF SE)

(Surfactant)

KF-352 (manufactured by Shin-Etsu Chemical Co., Ltd.)

In Table 1 below, the gelling temperatures of the inks measured by a method described below and printing temperatures are also listed (Ink C5 contains no gelling agent and thus has no gelling temperature.). The printing temperature (substrate temperature) was set at a temperature lower than the gelling temperature by about 10° C.

TABLE 1

| | | | Composition of ink | | | | | |
|---|---|---|---|---|---|---|---|---|
| Component | Product name | Compound name | Present invention Ink C1 | Present invention Ink C2 | Present invention Ink C3 | Comparative Example Ink C4 | Comparative Example Ink C5 | Comparative Example Ink C6 |
| Gelling agent | KAO Wax T1 | Distearyl ketone | | 1.0% | | | | |
| | UNISTAR M-2222SL | Behenyl behenate | | 1.0% | 1.0% | | | |
| | Diamide Y | Lauryl acid amide | 2.0% | | 0.5% | | | |
| | POEM M200 | Glycerin monocaprate | | | | 1.0% | | |
| | BLEMMER VA | Behenyl acrylate | | | | | | 2.0% |
| (Meth)acrylate compound A | Miramer M360 | 3PO-modified trimethylolpropane triacrylate | 5.0% | 5.0% | | 5.0% | 5.0% | 5.0% |
| Other photocurable compounds | A-400 | Polyethylene glycol #400 diacrylate | 38.8% | 38.8% | 44.3% | 39.8% | 40.8% | 38.8% |
| | SR499 | 6EO-modified trimethylolpropane triacrylate | 30.0% | 30.0% | 30.0% | 30.0% | 30.0% | 30.0% |
| Polymerization Inhibitor | Irgastab UV10 | — | 0.1% | 0.1% | 0.1% | 0.1% | 0.1% | 0.1% |
| Photopolymerization initiator | DAROCUR TPO | — | 6.0% | 6.0% | 6.0% | 6.0% | 6.0% | 6.0% |
| | IRGACURE 819 | — | 3.0% | 3.0% | 3.0% | 3.0% | 3.0% | 3.0% |
| Surfactant | KF-352 | — | 0.1% | 0.1% | 0.1% | 0.1% | 0.1% | 0.1% |
| C pigment dispersion | — | — | 15.0% | 15.0% | 15.0% | 15.0% | 15.0% | 15.0% |
| | Total | | 100% | 100% | 100% | 100% | 100% | 100% |
| | Ink gelling temperature (° C.) | | 45 | 55 | 51 | 43 | — | 44 |
| | Printing temperature (° C.) | | 35 | 45 | 40 | 35 | 25 | 35 |

(Measurement of Ink Gelling Temperature)

The gelling temperature of each ink prepared (Tgel) (° C.) was measured by a method below.

First, temperature-dependent changes in dynamic viscoelasticity of the ink was measured with a rheometer. Specifically, the ink was heated to 100° C., and then cooled to 20° C. under conditions of a shear rate of 11.7/s and a temperature lowering rate of 0.1° C./s to obtain a temperature-dependent viscosity change curve.

Next, the temperature at which the viscosity reached 200 mPa·s on the temperature-dependent viscosity change curve was determined as the gelling temperature.

The rheometer used was a stress-controlled rheometer, Physica MCR series manufactured by Anton Paar GmbH. The cone plate diameter was 75 mm, and the cone angle was 1.0°.

2. Corona Discharge Treatment

Recording media used for formation of an image were paper substrates shown in Table 2. The "basis weights" listed in Table 2 are values publicly announced by each manufacturer. The 60° gloss values of paper substrates before the corona discharge treatment are values determined with a gloss meter PG-II manufactured by Nippon Denshoku Industries Co., Ltd.

TABLE 2

List of paper substrates

| Substrate type | Product name, unit weight | Basis weight | Manufacturer | 60° Gloss value |
|---|---|---|---|---|
| Microflute | F flute | 550 g/m² | Crown Package Co., Ltd. | 12 |
| Coat Ivory | Perfect W | 360 g/m² | Hokuetsu Kishu Paper Co., Ltd. | 25 |
| Coated paper | OK Top Coat Plus | 128 g/m² | Oji Paper Co., Ltd. | 48 |
| Coated paper | OK Ever Green | 105 g/m² | Oji Paper Co., Ltd. | 60 |
| Cast coat | Esprit C | 209 g/m² | Nippon Paper Industries Co., Ltd. | 78 |
| Coated paper | Aqua Coat | 380 g/m² | Miyama Paper Manufacture Industry Co., Ltd. | 23 |

(Corona Discharge Treatment)

The paper substrates shown in Table 2 were subjected to the corona discharge treatment. Specifically, using a Digi Co-Primer manufactured by BN Technology Corporation as a corona treatment apparatus, surface treatment was performed under the following conditions. The treatment was performed using ceramic electrodes having an electrode length of 0.44 m (=440 mm) as the electrodes for the corona treatment apparatus, with a gap of 2 mm between the electrodes and dielectric.

TABLE 3

Corona discharge treatment conditions

| Speed m/min | Electric power W | Discharge W · min/m² |
|---|---|---|
| — | — | None |
| 100.0 | 220.0 | 5 |
| 50.0 | 220.0 | 10 |
| 25.0 | 220.0 | 20 |
| 10.0 | 220.0 | 50 |
| 5.0 | 220.0 | 100 |

TABLE 3-continued

| Corona discharge treatment conditions | | |
|---|---|---|
| Speed m/min | Electric power W | Discharge W · min/m² |
| 3.3 | 220.0 | 150 |
| 2.5 | 220.0 | 200 |

3. Image Formation

Each ink prepared was loaded in an inkjet recording apparatus having inkjet recording heads each equipped with piezo type inkjet nozzles. The ink supplying system used had ink tanks, ink flow paths, sub-ink tanks immediately before the inkjet recording heads, metal filter-attached piping, and piezo heads. The area from the ink tanks to the head portion was warmed to 100° C. To the piezo heads used, KM512LHB, a voltage was applied such that droplets of 42 pl would be ejected. Ejection was performed using one head having a resolution of 360 dpi to print a 360×360 dpi solid image on each of the paper substrates of Table 2, which were each surface-treated under conditions shown in Table 3. Combinations of the ink, paper substrate, and surface treatment conditions are shown in Table 4.

Within one second after printing, the ink layer was cured by irradiation from an LED lamp (395 nm, 8 W/cm², manufactured by Phoseon Technology). The distance from the pipe surface of the LED lamp to the recording medium was 50 mm (width of irradiation in the conveying direction: 100 mm) The conveying speed for the recording medium was 800 mm/sec.

With respect to each of images obtained, the difference between the 60° gloss values of the printed portion B and non-printed portion A (gloss difference) and the curability of the printed portion were measured and evaluated in accordance with the following criteria.

(Gloss Difference)

The 60° gloss value B of the solid image and the 60° gloss value of the non-printed portion A were measured using a gloss meter PG-II manufactured by Nippon Denshoku Industries Co., Ltd., and the difference between the gloss values was determined. Based on the values obtained, evaluation was made in accordance with the following criteria.

A: Use of a substrate that has a gloss difference between the printed portion and the non-printed portion (B−A) of 10 or more at a corona discharge amount of 0 and is subjected to the corona discharge treatment provides a reduced gloss difference (B'−A'). That is, (B−A)≥10 and (B−A)>(B'−A').

B: Use of a substrate that has a gloss difference between the printed portion and the non-printed portion (B−A) of less than 10 at a corona discharge amount of 0 and is subjected to the corona discharge treatment provides a further reduced gloss difference (B'−A'). That is, (B−A)<10 and (B−A)>(B'−A').

C: Even when a substrate that has a gloss difference between the printed portion and the non-printed portion (B−A) of 10 or more at a corona discharge amount of 0 and is subjected to the corona discharge treatment is used, the gloss difference (B'−A') is equal to or larger than (B−A). That is, (B−A)≥10 and (B−A)≤(B'−A').

In order to achieve the effect of the present invention, the criteria A or C has to be met.

(Curability)

The printed portion of the solid image was rubbed with JK Wiper (manufactured by Nippon Paper Group Crecia Co., Ltd.) 50 times under a load of 500 g. The state of the image portion after rubbing was evaluated in accordance with the following criteria.

A: No abrasion remains at all on either the JK Wiper or the image portion.

B: Abrasions are visually observed slightly on the JK Wiper.

C: Abrasions are visually observed both on the JK Wiper and the image portion.

The substrate type, amount of corona discharge, 60° gloss value of the non-printed portion, 60° gloss value of the printed portion, and gloss difference, and evaluation results of the images described above for each ink injected are shown in Tables 4 to 9 below.

TABLE 4

| Image formation with ink C1 | | | | | | | |
|---|---|---|---|---|---|---|---|
| | | Amount of corona discharge W · min/m² | 60° Gloss value of non-printed portion (A) | 60° Gloss value of printed portion (B) | Gloss difference (B − A) | Evaluation criteria | |
| Image No. | Ink Substrate type | | | | | Gloss difference | Curability |
| 1 | C1 F flute | 0 | 12 | 48 | 36 | — | A |
| 2 | | 50 | 12 | 43 | 31 | A | A |
| 3 | | 100 | 12 | 38 | 26 | A | A |
| 4 | | 150 | 12 | 31 | 19 | A | A |
| 5 | | 200 | 12 | 23 | 11 | A | B |
| 6 | Perfect W | 0 | 25 | 50 | 25 | — | A |
| 7 | | 10 | 25 | 40 | 15 | A | A |
| 8 | | 50 | 25 | 38 | 13 | A | A |
| 9 | | 100 | 25 | 35 | 10 | A | A |
| 10 | OK Top Coat Plus | 0 | 48 | 59 | 11 | — | A |
| 11 | | 20 | 48 | 54 | 6 | A | A |
| 12 | OK Ever Green | 0 | 60 | 64 | 4 | — | A |
| 13 | | 10 | 60 | 50 | 10 | C | A |
| 14 | Esprit C | 0 | 78 | 67 | 11 | — | A |
| 15 | | 50 | 78 | 48 | 30 | C | A |
| 16 | Aqua Coat | 0 | 23 | 58 | 35 | — | A |
| 17 | | 25 | 23 | 40 | 17 | A | B |

TABLE 5

Image formation with ink C2

| Image No. | Ink | Substrate type | Amount of corona discharge W·min/m² | 60° Gloss value of non-printed portion (A) | 60° Gloss value of printed portion (B) | Gloss difference (B − A) | Gloss difference | Curability |
|---|---|---|---|---|---|---|---|---|
| 18 | C2 | F flute | 0 | 12 | 35 | 23 | — | A |
| 19 | | | 10 | 12 | 23 | 11 | A | A |
| 20 | | | 50 | 12 | 20 | 8 | A | A |
| 21 | | | 100 | 12 | 15 | 3 | A | A |
| 22 | | | 150 | 12 | 16 | 4 | A | A |
| 23 | | | 200 | 12 | 10 | 2 | A | B |
| 24 | | Perfect W | 0 | 25 | 40 | 15 | — | A |
| 25 | | | 10 | 25 | 33 | 8 | A | A |
| 26 | | | 50 | 25 | 28 | 3 | A | A |
| 27 | | | 100 | 25 | 25 | 0 | A | A |
| 28 | | OK Top Coat Plus | 0 | 48 | 43 | 5 | — | A |
| 29 | | | 20 | 48 | 46 | 2 | B | A |
| 30 | | OK Ever Green | 0 | 60 | 49 | 11 | — | A |
| 31 | | | 10 | 60 | 40 | 20 | C | A |
| 32 | | Esprit C | 0 | 78 | 48 | 30 | — | A |
| 33 | | | 50 | 78 | 35 | 43 | C | A |
| 34 | | Aqua Coat | 0 | 23 | 40 | 17 | — | A |
| 35 | | | 25 | 23 | 30 | 7 | A | B |

TABLE 6

Image formation with ink C3

| Image No. | Ink | Substrate type | Amount of corona discharge W·min/m² | 60° Gloss value of non-printed portion (A) | 60° Gloss value of printed portion (B) | Gloss difference (B − A) | Gloss difference | Curability |
|---|---|---|---|---|---|---|---|---|
| 36 | C3 | F flute | 0 | 12 | 43 | 31 | — | A |
| 37 | | | 50 | 12 | 30 | 18 | A | A |
| 38 | | | 100 | 12 | 25 | 13 | A | A |
| 39 | | | 150 | 12 | 24 | 12 | A | A |
| 40 | | | 200 | 12 | 23 | 11 | A | B |
| 41 | | Perfect W | 0 | 25 | 48 | 23 | — | A |
| 42 | | | 10 | 25 | 35 | 10 | A | A |
| 43 | | | 50 | 25 | 33 | 8 | A | A |
| 44 | | | 100 | 25 | 30 | 5 | A | A |
| 45 | | OK Top Coat Plus | 0 | 48 | 58 | 10 | — | A |
| 46 | | | 10 | 48 | 48 | 0 | A | A |
| 47 | | OK Ever Green | 0 | 60 | 61 | 1 | — | A |
| 48 | | | 10 | 60 | 43 | 17 | C | A |
| 49 | | Esprit C | 0 | 78 | 64 | 14 | — | A |
| 50 | | | 50 | 78 | 40 | 38 | C | A |
| 51 | | Aqua Coat | 0 | 23 | 52 | 29 | — | A |
| 52 | | | 25 | 23 | 34 | 11 | A | B |

TABLE 7

Image formation with ink C4

| Image No. | Ink | Substrate type | Amount of corona discharge W·min/m² | 60° Gloss value of non-printed portion (A) | 60° Gloss value of printed portion (B) | Gloss difference (B − A) | Gloss difference | Curability |
|---|---|---|---|---|---|---|---|---|
| 53 | C4 | F flute | 0 | 12 | 68 | 56 | — | B |
| 54 | | | 50 | 12 | 68 | 56 | C | B |
| 55 | | | 100 | 12 | 68 | 56 | C | B |
| 56 | | | 150 | 12 | 68 | 56 | C | B |
| 57 | | | 200 | 12 | 68 | 56 | C | C |
| 58 | | Perfect W | 0 | 25 | 73 | 48 | — | B |
| 59 | | | 25 | 25 | 73 | 48 | C | B |
| 60 | | | 50 | 25 | 73 | 48 | C | B |
| 61 | | | 100 | 25 | 73 | 48 | C | B |
| 62 | | OK Top Coat Plus | 0 | 48 | 70 | 22 | — | B |

TABLE 7-continued

Image formation with ink C4

| Image No. | Ink | Substrate type | Amount of corona discharge W·min/m² | 60° Gloss value of non-printed portion (A) | 60° Gloss value of printed portion (B) | Gloss difference (B − A) | Evaluation criteria Gloss difference | Curability |
|---|---|---|---|---|---|---|---|---|
| 63 | | | 25 | 48 | 70 | 22 | C | B |
| 64 | | OK Ever Green | 0 | 60 | 74 | 14 | — | B |
| 65 | | | 10 | 60 | 74 | 14 | C | B |
| 66 | | Esprit C | 0 | 78 | 81 | 3 | — | B |
| 67 | | | 50 | 78 | 81 | 3 | C | B |
| 68 | | Aqua Coat | 0 | 23 | 68 | 45 | — | B |
| 69 | | | 25 | 23 | 68 | 45 | C | C |

TABLE 8

Image formation with ink C5

| Image No. | Ink | Substrate type | Amount of corona discharge W·min/m² | 60° Gloss value of non-printed portion (A) | 60° Gloss value of printed portion (B) | Gloss difference (B − A) | Evaluation criteria Gloss difference | Curability |
|---|---|---|---|---|---|---|---|---|
| 70 | C5 | F flute | 0 | 12 | 98 | 86 | — | C |
| 71 | | | 50 | 12 | 98 | 86 | C | C |
| 72 | | | 100 | 12 | 98 | 86 | C | C |
| 73 | | | 150 | 12 | 98 | 86 | C | C |
| 74 | | | 200 | 12 | 98 | 86 | C | C |
| 75 | | Perfect W | 0 | 25 | 105 | 80 | — | C |
| 76 | | | 25 | 25 | 105 | 80 | C | C |
| 77 | | | 50 | 25 | 105 | 80 | C | C |
| 78 | | | 100 | 25 | 105 | 80 | C | C |
| 79 | | OK Top Coat Plus | 0 | 48 | 90 | 42 | — | C |
| 80 | | | 25 | 48 | 90 | 42 | C | C |
| 81 | | OK Ever Green | 0 | 60 | 93 | 33 | — | C |
| 82 | | | 10 | 60 | 93 | 33 | C | C |
| 83 | | Esprit C | 0 | 78 | 113 | 35 | — | C |
| 84 | | | 50 | 78 | 113 | 35 | C | C |
| 85 | | Aqua Coat | 0 | 23 | 88 | 65 | — | C |
| 86 | | | 25 | 23 | 88 | 65 | C | C |

TABLE 9

Image formation with ink C6

| Image No. | Ink | Substrate type | Amount of corona discharge W·min/m² | 60° Gloss value of non-printed portion (A) | 60° Gloss value of printed portion (B) | Gloss difference (B − A) | Evaluation criteria Gloss difference | Curability |
|---|---|---|---|---|---|---|---|---|
| 87 | C6 | F flute | 0 | 12 | 44 | 32 | — | A |
| 88 | | | 50 | 12 | 44 | 32 | C | A |
| 89 | | | 100 | 12 | 44 | 32 | C | A |
| 90 | | | 150 | 12 | 44 | 32 | C | A |
| 91 | | | 200 | 12 | 44 | 32 | C | B |
| 92 | | Perfect W | 0 | 25 | 51 | 26 | — | A |
| 93 | | | 5 | 25 | 51 | 26 | C | B |
| 94 | | | 10 | 25 | 51 | 26 | C | A |
| 95 | | | 50 | 25 | 51 | 26 | C | A |
| 96 | | | 100 | 25 | 51 | 26 | C | A |
| 97 | | OK Top Coat Plus | 0 | 48 | 56 | 8 | — | A |
| 98 | | | 20 | 48 | 56 | 8 | C | A |
| 99 | | OK Ever Green | 0 | 60 | 65 | 5 | — | A |
| 100 | | | 10 | 60 | 65 | 5 | C | A |
| 101 | | Esprit C | 0 | 78 | 66 | 12 | — | A |
| 102 | | | 50 | 78 | 66 | 12 | C | A |
| 103 | | Aqua Coat | 0 | 23 | 60 | 37 | — | A |
| 104 | | | 25 | 23 | 60 | 37 | C | B |

Tables 4 to 6, which show the results of Examples, are results of formation of images by use of the gel inks of Examples, that is, inks C1 to C3 that each contain a gelling agent having no polymerizable group and having an alkyl group containing a linear portion of 12 or more and 26 or less carbon atoms. When these inks were each used for formation of an image on paper substrates having a 60° gloss value of 5 or more and 50 or less, that is, F flute, Perfect W, OK Top Coat Plus, and Aqua Coat shown in Tables, the gloss difference between the printed portion and the non-printed portion was reduced, and the curability of printed portion was not reduced. As the amount of the corona discharge was increased, the gloss difference tended to decrease, but with an excessive amount of the corona discharge, the curability decreased in some cases (images 5 and 18 in Table 4, image 36 in Table 5, and images 41 and 53 in Table 6). It is conceived that this is because the hydrophilicity of the substrate surface was enhanced by the corona discharge treatment and thus a portion of the ink permeated the substrate before the ink was cured.

When ink C2 and ink C3 that respectively contained a compound represented by the general formula (G1) and a compound represented by the general formula (G2) as a gelling agent were each used, the reduction in the gloss difference of the images by the corona discharge treatment was more marked than in the case of using ink C1, which did not contain the gelling agent described above. It is conceived that this is because the compound represented by the general formula (G1) or the compound represented by the general formula (G2), which had high hydrophobicity, and thus a larger portion of the gelling agent than that of other gelling agent migrated to the cured film surface of the ink to thereby increase unevenness.

Ink C2, which contains a (meth)acrylate compound A, which has a molecular weight of 280 or more and 1,500 or less and a C log P value of 4.0 or more and 7.0 or less, as a photocurable compound was an ink having a lower gloss value than that of ink C3, which contains a (meth)acrylate compound having a C log P value of less than 4.0, as a photocurable compound. It is conceived that this is because the photocurable compound having a C log P value of 4.0 or more had higher hydrophobicity and thus a larger portion of the gelling agent became repellent and migrated to the cured film surface of the ink to thereby increase unevenness.

When an image was formed on OK Ever Green or Esprit C having a 60° gloss value of more than 50, a reduction in the gloss value of the printed portion due to the corona discharge treatment resulted in an increase in the gloss difference between the printed portion and the non-printed portion, conversely.

As clear from the results of Tables 4 to 6, in the case of formation of an image using the gel ink of the present invention on a paper substrate having a 60° gloss value of 5 or more and 50 or less, the amount of the corona discharge of 5 W·min/m$^2$ or more and less than 200 W·min/m$^2$, preferably 10 W·min/m$^2$ or more and less than 150 W·min/m$^2$ was able to reduce the gloss difference between the printed portion and the non-printed portion while maintaining the curability of the ink, irrespective of substrate types and ink types.

Meanwhile, as clear from Tables 7 and 8, which show the results of Comparative Examples, the curability of ink C4 of Comparative Example containing a gelling agent having an alkyl group containing a linear portion of less than 12 was evaluated higher than that of ink C5 of Comparative Example containing no gelling agent. However, even when either of the inks was used, there was observed no effect of reducing the gloss difference between the printed portion and the non-printed portion by the corona discharge treatment.

As clear from Table 9, ink C6, which contains a gelling agent having a polymerizable group (behenyl acrylate) exhibited no change in the 60° gloss value of the printed portion even subjected to the corona discharge treatment. It is conceived that the gloss value was not changed because the gelling agent having a polymerizable group, which is likely to be incorporated into a polymer chain formed by polymerization of the photocurable compound, is unlikely to migrate to the vicinity of the cured film surface of the ink irrespective of the corona discharge treatment.

A table in which the type of recording media, type of inks to be used, and amounts of corona discharge necessary for surface modification of the recording media are associated with one another was made based on the data of Examples shown in Tables 4 to 6 above.

Examples 4 and 5 and Comparative Example 4

1. Preparation of Ink Sets 1 to 3

The following components and each pigment dispersion below were mixed in accordance with the ink compositions listed in the following Table 10, and the each mixture was heated to 80° C. and stirred. The solutions obtained each were filtered with a Teflon (registered trademark) membrane filter (3 µm) manufactured by Advantec Toyo Kaisha, Ltd. under heating to prepare each of a yellow ink, a magenta ink, a cyan ink, and a black ink, which constitute Ink sets 1 to 3.

The contents of the components in Table 10 are each expressed in mass %.

(Materials for Inks)

[Gelling Agent]

Distearyl ketone (KAO Wax T1: manufactured by Kao Corporation, number of carbon atoms: 17-17)

Behenyl behenate (UNISTAR M-2222SL: manufactured by NOF Corporation, number of carbon atoms: 21-22)

Lauryl acid amide (Diamide Y: manufactured by Nippon Kasei Chemical Co., Ltd., number of carbon atoms: 12)

Glycerin monocaprate (POEM M200: manufactured by Riken Vitamin Co., Ltd., number of carbon atoms: 10)

[(Meth)acrylate Compound A]

3PO-modified trimethylolpropane triacrylate (Miramer M360: manufactured by Miwon Specialty Chemical Co., Ltd.) (molecular weight: 470, C log P value: 4.9)

[Other Photocurable Compounds]

Polyethylene glycol #400 diacrylate (NK ESTER A-400: manufactured by Shin-Nakamura Chemical Co., Ltd.) (molecular weight: 508, C log P value: 0.5)

6EO-modified trimethylolpropane triacrylate (SR499: manufactured by Sartomer Company, Inc.) (molecular weight: 428, C log P value: 3.6)

[Other Additives]

(Polymerization Inhibitor)

Irgastab UV10 (manufactured by BASF SE)

(Photopolymerization Initiator)

DAROCUR TPO (manufactured by BASF SE)

IRGACURE 819 (manufactured by BASF SE)

(Surfactant)

KF-352 (manufactured by Shin-Etsu Chemical Co., Ltd.)

In Table 10 below, the gelling temperatures of the inks measured by a method described below and printing temperatures are also listed. The printing temperature (substrate temperature) was set at a temperature lower than the gelling temperature by 10° C.

TABLE 10

Composition of ink

| Component | Product name | Compound name | Ink set 1 Y1 | M1 | C1 | K1 | Ink set 2 Y2 | M2 | C2 |
|---|---|---|---|---|---|---|---|---|---|
| Gelling agent | KAO Wax T1 | Distearyl ketone | 1.0% | 1.0% | 1.0% | 1.0% | | | |
| | UNISTAR M-2222SL | Behenyl behenate | 1.0% | 1.0% | 1.0% | 1.0% | | | |
| | Diamide Y | Lauryl acid amide | | | | | 2.0% | 2.0% | 2.0% |
| | POEM M200 | Glycerin monocaprate | | | | | | | |
| (Meth)acrylate compound A | Miramer M360 | 3PO-modified trimethylolpropane triacrylate | 5.0% | 5.0% | 5.0% | 5.0% | 5.0% | 5.0% | 5.0% |
| Other photocurable compounds | A-400 | Polyethylene glycol #400 diacrylate | 38.8% | 38.8% | 38.8% | 38.8% | 38.8% | 38.8% | 39.0% |
| | SR499 | 6EO-modified trimethylolpropane triacrylate | 30.0% | 30.0% | 30.0% | 30.0% | 30.0% | 30.0% | 30.0% |
| Polymerization Inhibitor | Irgastab UV10 | — | 0.1% | 0.1% | 0.1% | 0.1% | 0.1% | 0.1% | 0.1% |
| Photopolymerization initiator | DAROCUR TPO | — | 6.0% | 6.0% | 6.0% | 6.0% | 6.0% | 6.0% | 6.0% |
| | IRGACURE 819 | — | 3.0% | 3.0% | 3.0% | 3.0% | 3.0% | 3.0% | 3.0% |
| Surfactant | KF-352 | — | 0.1% | 0.1% | 0.1% | 0.1% | 0.1% | 0.1% | 0.1% |
| | Y pigment dispersion | | 15.0% | | | | 15.0% | | |
| | M pigment dispersion | | | 15.0% | | | | 15.0% | |
| | C pigment dispersion | | | | 15.0% | | | | 15.0% |
| | K pigment dispersion | | | | | 15.0% | | | |
| | Total | | 100% | 100% | 100% | 100% | 100% | 100% | 100% |
| | Ink gelling temperature (° C.) | | 55 | 55 | 55 | 55 | 45 | 45 | 45 |
| | Printing temperature (° C.) | | | | 45 | | | 35 | |

| Component | Product name | Compound name | Ink set 2 K2 | Ink set 3 Y3 | M3 | C3 | K3 |
|---|---|---|---|---|---|---|---|
| Gelling agent | KAO Wax T1 | Distearyl ketone | | | | | |
| | UNISTAR M-2222SL | Behenyl behenate | | | | | |
| | Diamide Y | Lauryl acid amide | 2.0% | | | | |
| | POEM M200 | Glycerin monocaprate | | 1.0% | 1.0% | 1.0% | 1.0% |
| (Meth)acrylate compound A | Miramer M360 | 3PO-modified trimethylolpropane triacrylate | 5.0% | 5.0% | 5.0% | 5.0% | 5.0% |
| Other photocurable compounds | A-400 | Polyethylene glycol #400 diacrylate | 38.8% | 39.8% | 39.8% | 39.8% | 39.8% |
| | SR499 | 6EO-modified trimethylolpropane triacrylate | 30.0% | 30.0% | 30.0% | 30.0% | 30.0% |
| Polymerization Inhibitor | Irgastab UV10 | — | 0.1% | 0.1% | 0.1% | 0.1% | 0.1% |
| Photopolymerization initiator | DAROCUR TPO | — | 6.0% | 6.0% | 6.0% | 6.0% | 6.0% |
| | IRGACURE 819 | — | 3.0% | 3.0% | 3.0% | 3.0% | 3.0% |
| Surfactant | KF-352 | — | 0.1% | 0.1% | 0.1% | 0.1% | 0.1% |
| | Y pigment dispersion | | | 15.0% | | | |
| | M pigment dispersion | | | | 15.0% | | |
| | C pigment dispersion | | | | | 15.0% | |
| | K pigment dispersion | | 15.0% | | | | 15.0% |
| | Total | | 100% | 100% | 100% | 100% | 100% |
| | Ink gelling temperature (° C.) | | 45 | 43 | 43 | 43 | 43 |
| | Printing temperature (° C.) | | 35 | | 35 | | |

(Measurement of Ink Gelling Temperature)

The gelling temperature of each ink (Tgel) (° C.) was measured in the same manner as for ink C1 to C6 described above.

2. Corona discharge treatment Paper substrates shown in Table 11, as recording media for formation of an image, were subjected to the corona discharge treatment. Specifically, using a Digi Co-Primer manufactured by BN Technology Corporation as a corona treatment apparatus, surface treatment was performed under conditions: speed: 10.0 m/min, electric power: 220.0 W, and discharge: 50 W·min/m². In the corona treatment apparatus, ceramic electrodes were used, and treatment was performed with a gap of 2 mm between the electrodes and dielectric.

3. Image Formation

The inks of ink set 1 were each loaded in an inkjet recording apparatus having inkjet recording heads each equipped with piezo type inkjet nozzles. The ink supplying system used had ink tanks, ink flow paths, sub-ink tanks immediately before the inkjet recording heads, metal filter-attached piping, and piezo heads. The area from the ink tanks to the head portion was warmed to 100° C.

To the piezo heads, a voltage was applied such that droplets of 6 pl would be ejected. Ejection was performed using four heads each having a resolution of 360 dpi to form a 1,440×1,440 dpi solid image of the black ink and a color portrait image (CMYK standard colour image data, JISX9201:1995, N1) on each substrate shown in Table 10.

Within one second after printing, the ink layer was cured by irradiation from an LED lamp (395 nm, 8 W/cm², manufactured by Phoseon Technology). The distance from the pipe surface of the LED lamp to the recording medium was 50 mm (width of irradiation in the conveying direction: 100 mm) The conveying speed for the recording medium was 800 mm/sec.

The resulting solid image of the black ink was evaluated for the gloss difference between the printed portion and the non-printed portion and curability, and the color portrait image was evaluated for color bleeding.

(Gloss Difference)

The gloss difference between the printed portion and the non-printed portion was measured and evaluated in the same manner as for the image formation using inks C1 to C6 described above.

(Curability)

The curability of the printed portion was measured and evaluated in the same manner as for the image formation using inks C1 to C6 described above.

(Color Bleeding)

The image portion formed using two or more inks in the portrait image was visually observed, and color bleeding was evaluated in accordance with the following criteria.

A: High definition image having no bleeding in the mixed color portion observed

C: Low quality image having occurrence of bleeding in the mixed color portion

The substrate type, the 60° gloss value of the non-printed portion, the 60° gloss value of the printed portion, gloss difference, and evaluation results of the images described above for each ink set used are shown in Table 11 below.

As clear from Table 11 above, when the gel ink of Examples 4 or 5, that is, ink set 1 or 2, which is an ink containing a gelling agent that has no polymerizable group and has an alkyl group containing a linear portion of 12 or more and 26 or less carbon atoms was used to form an image on a paper substrate having a 60° gloss value of 5 or more and 50 or less, that is, F flute or Perfect W in the table, the gloss difference between the printed portion and the non-printed portion was reduced, and the curability of printed portion was not reduced. Furthermore, there was no color bleeding in the portrait image.

Ink set 1 is composed of inks including a gelling agent that is a compound represented by the general formula (G1) or a compound represented by the general formula (G2) and, as the photocurable compound, photocurable compound A, which is a (meth)acrylate compound having a molecular weight of 280 or more and 1,500 or less and a C log P value of 4.0 or more and 7.0 or less. Ink set 1 has lower gloss than that of ink set 2, which contains inks each containing a gelling agent other than the gelling agent described above, and had a reduced gloss difference by the corona discharge treatment. It is conceived that this is because the compound represented by the general formula (G1) or the compound represented by the general formula (G2) had high hydrophobicity and thus a larger portion of the gelling agent than that of other gelling agent migrated to the cured film surface of the ink to thereby increase unevenness.

When Esprit C having was used as a paper substrate having a 60° gloss value of more than 50, either with ink set 1 or 2, a reduction in the gloss value of the printed portion due to the corona discharge treatment resulted in an increase in the gloss difference between the printed portion and the non-printed portion, conversely.

Ink set 3 of Comparative Example 4 is composed of inks containing a gelling agent that has an alkyl group containing a linear portion of less than 12 carbon atoms. When ink set 3 was used, no reduction in the gloss value due to corona discharge treatment was observed irrespective of types of paper substrate. Color bleeding also occurred.

TABLE 11

| | | | | | | | Evaluation criteria | | |
|---|---|---|---|---|---|---|---|---|---|
| Image No. | Ink | Substrate type | Amount of corona discharge W · min/m² | 60° Gloss value of non-printed portion (A) | 60° Gloss value of printed portion (B) | Gloss difference (B − A) | Gloss difference | Curability | Color bleeding |
| 105 | 1 | F flute | 0 | 12 | 40 | 28 | — | A | A |
| 106 | | F flute | 50 | 12 | 23 | 11 | A | A | A |
| 107 | | Perfect W | 0 | 25 | 45 | 20 | — | A | A |
| 108 | | Perfect W | 50 | 25 | 33 | 8 | A | A | A |
| 109 | | Esprit C | 0 | 78 | 53 | 25 | — | A | A |
| 110 | | Esprit C | 50 | 78 | 40 | 38 | C | A | A |
| 111 | 2 | F flute | 0 | 12 | 55 | 43 | — | A | A |
| 112 | | F flute | 50 | 12 | 45 | 33 | A | A | A |
| 113 | | Perfect W | 0 | 25 | 56 | 31 | — | A | A |
| 114 | | Perfect W | 50 | 25 | 43 | 18 | A | A | A |
| 115 | | Esprit C | 0 | 78 | 70 | 8 | — | A | A |
| 116 | | Esprit C | 50 | 78 | 51 | 27 | C | A | A |
| 117 | 3 | F flute | 0 | 12 | 73 | 61 | — | B | C |
| 118 | | F flute | 50 | 12 | 73 | 61 | C | B | C |
| 119 | | Perfect W | 0 | 25 | 80 | 55 | — | B | C |
| 120 | | Perfect W | 50 | 25 | 80 | 55 | C | B | C |
| 121 | | Esprit C | 0 | 78 | 85 | 7 | — | B | C |
| 122 | | Esprit C | 50 | 78 | 85 | 7 | C | B | C |

This application claims the benefit of Japanese Patent Application No. 2016-091498 filed on Apr. 28, 2016. The content described herein is incorporated herein by reference in its entirety.

INDUSTRIAL APPLICABILITY

According to the image forming method and the image forming apparatus of the present invention, it is possible to form an image having a reduced gloss difference between an area on which an image has been formed and an area on which no image has been formed with a gel ink(s), irrespective of the type of paper substrate to be used as a recording medium. Accordingly, the present invention is expected to broaden applications of gel inks by inkjet methods and to contribute to development and proliferation of the techniques of the field.

REFERENCE SIGNS LIST

10 Inkjet printer
11 Corona discharge treatment section
12 Recording medium
14 Inkjet recording head
16 Head carriage
18 Actinic radiation irradiation section
19 Temperature control section
30 Ink flow path
31 Ink tank
41 Paper substrate
42 Stage
43 Feed roller
44 Electrode
45 Dielectric

The invention claimed is:

1. An image forming method for forming an image on a recording medium by use of an inkjet ink which contains a photocurable compound and a gelling agent having no polymerizable group and which undergoes temperature-induced sol-gel phase transition,
wherein the gelling agent has an alkyl group with a linear portion containing 12 or more and 26 or less carbon atoms, and
the recording medium is a paper substrate having a 60° gloss value of 5 or more and 50 or less before a corona discharge treatment,
the method comprising:
performing the corona discharge treatment on the paper substrate;
ejecting droplets of the inkjet ink from a nozzle of an inkjet head and landing the droplets on a surface of the paper substrate subjected to the corona discharge treatment; and
irradiating the droplets of the inkjet ink landed on the paper substrate surface with actinic radiation to cure the inkjet ink.

2. The image forming method according to claim 1, comprising, before performing the corona discharge treatment of the paper substrate, setting an amount of a corona discharge for surface modification of the paper substrate by referring to a table which correlates a type of the paper substrate, a type of the inkjet ink, and the amount of the corona discharge necessary for the surface modification, wherein the corona discharge treatment of the paper substrate is performed with the set amount of the corona discharge.

3. The image forming method according to claim 1, wherein the amount of the corona discharge for performing the corona discharge treatment is 5 W·min/m$^2$ or more and less than 200 W·min/m$^2$.

4. The image forming method according to claim 3, wherein the amount of the corona discharge for performing the corona discharge treatment is 10 W·min/m$^2$ or more and less than 150 W·min/m$^2$.

5. The image forming method according to claim 1, wherein the gelling agent comprises at least one member selected from the group consisting of compounds represented by the general formulas (G1) and (G2):

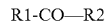            General formula (G1):

            General formula (G2):

wherein R1 to R4 each independently represent an alkyl group containing a linear portion having 12 or more and 26 or less carbon atoms and optionally containing a branch.

6. The image forming method according to claim 1, wherein the photocurable compound contains a (meth)acrylate compound having a molecular weight of 280 or more and 1,500 or less and a C log P value of 4.0 or more and 7.0 or less.

7. An image forming apparatus comprising:
a corona discharge treatment section that modifies a surface of a recording medium;
an inkjet head having a nozzle face, on which an ejection port of a nozzle is provided, the nozzle being capable of ejecting droplets of an inkjet ink which contains a photocurable compound and a gelling agent having no polymerizable group and which undergoes temperature-induced sol-gel phase transition;
a conveying section that conveys the recording medium at a position which is directly below, in a vertical direction, the ejection port of the nozzle of the inkjet head, so as to move the recording medium opposite to the inkjet head;
an irradiation section that irradiates an upper face of the conveying section with actinic radiation from a light source; and
a control section that controls the corona discharge treatment section, the inkjet head, the conveying section and the irradiation section;
wherein the recording medium is a paper substrate, and the corona discharge treatment section performs a surface treatment of a paper substrate having a 60° gloss value of 5 or more and 50 or less.

* * * * *